United States Patent [19]

Watanabe et al.

[11] Patent Number: 4,561,249

[45] Date of Patent: Dec. 31, 1985

[54] CONTROL SYSTEM FOR HYDRAULIC CIRCUIT APPARATUS

[75] Inventors: Hiroshi Watanabe; Eiki Izumi; Yukio Aoyagi; Kazuo Honma; Kichio Nakajima, all of Ibaraki, Japan

[73] Assignee: Hitachi, Ltd., Tokyo, Japan

[21] Appl. No.: 426,096

[22] Filed: Sep. 28, 1982

[30] Foreign Application Priority Data

Oct. 2, 1981 [JP] Japan ................................ 56-156176

[51] Int. Cl.$^{4}$ .............................................. F16H 39/46

[52] U.S. Cl. ........................................ 60/421; 60/429; 60/469; 417/216

[58] Field of Search .................. 417/216; 60/421, 428, 60/429, 469, 486

[56] References Cited

U.S. PATENT DOCUMENTS 4,321,014 3/1982 Eburn, Jr. et al. ..................... 417/5

4,369,625 1/1983 Izumi et al. ........................... 60/327

*Primary Examiner*—Charles T. Jordan

*Assistant Examiner*—Richard Klein

*Attorney, Agent, or Firm*—Antonelli, Terry & Wands

[57] ABSTRACT

A control system for a hydraulic circuit having at least first and second hydraulic pumps of the variable displacement type, a first hydraulic actuator arranged for hydraulic connection with the first pump through first valve to be driven thereby, and a second hydraulic actuator arranged for selective hydraulic connection with said first and second pumps through second and third valve respectively to be driven thereby. The order of priority for hydraulic connection is preset so that, when an operation signal for the second actuator is received while the first pump is inoperative, the first pump takes priority over the second pump, and when an operation signal for the first actuator is received while the first pump is in hydraulic connection with the second actuator, the first actuator takes priority over the second actuator and the second actuator is brought into hydraulic connection with the second pump, and the displacement volume of the first pump and switching of the second valve means are controlled such that, when the first pump which is, in hydraulic connection with the second actuator, is to be brought into hydraulic connection with the first actuator, the displacement volume of the first pump is returned to zero before changing of the hydraulic connection. The control system includes a first judging device for determining if the first pump is in hydraulic connection with the second actuator when the operation signal for the first actuator is received, and for generating a command for backing up reduction in the supply of hydraulic fluid into the second actuator simultaneously when the displacement volume of the first pump begins to returns to zero. When judged that the first pump is in hydraulic connection with the second actuator, a command signal switches a third valve to an open position in accordance with the backup command. A command for initiating a displacement of the second pump is generated in accordance with the backup command.

2 Claims, 21 Drawing Figures

RELATION BETWEEN a, b INPUTS AND c OUTPUT OF LOGICAL CIRCUITS 714, 715

| b \ a | '0' | '1' |
|---|---|---|
| '0' | '0' | '1' |
| '1' | '0' | '0' |

FIG. 8
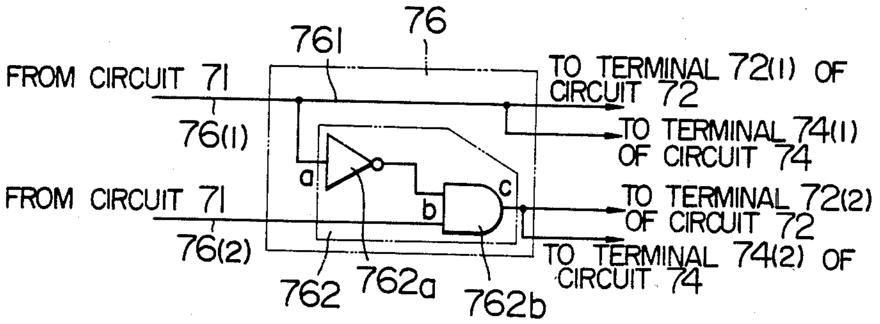
FIG. 9
RELATION BETWEEN a, b INPUTS AND c OUTPUT OF LOGICAL CIRCUIT 762
| b \ a | '0' | '1' |
|---|---|---|
| '0' | '0' | '0' |
| '1' | '1' | '0' |
FIG. 14
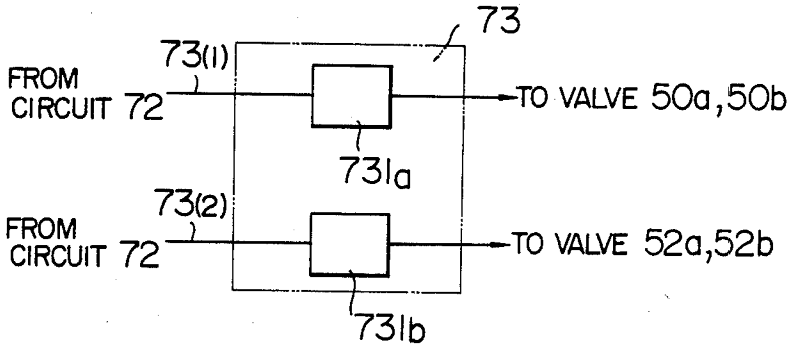

RELATION BETWEEN SR INPUTS AND $\bar{Q}$ OUTPUT OF RS FLIP-FLOP CIRCUITS 723a AND 723b

| R \ S | '0' | '1' |
|---|---|---|
| '0' | — | '1' |
| '1' | '0' | KEEP |

CONTROL SYSTEM FOR HYDRAULIC CIRCUIT APPARATUS

BACKGROUND OF THE INVENTION

This invention relates to hydraulic circuit apparatus for construction machines, such as hydraulic excavators, hydraulic cranes, etc., and more particularly to a control system for a hydraulic circuit apparatus for controlling the speeds of actuators by the displacement volumes of hydraulic pumps.

Nowadays in hydraulic circuit apparatus for civil engineering and construction machines, such as hydraulic excavators, hydraulic cranes, etc., speeds of the actuators are controlled by the displacement volumes of variable displacement hydraulic pumps. For example, in a hydraulic excavator, a plurality of variable displacement type hydraulic pumps are connected in closed or semi-closed circuit with actuators for driving working elements, such as a boom, an arm, a bucket, a pair of tracks and a swing, so as to control the speeds and directions of movements of the actuators by the displacement volumes and directions of the hydraulic pumps. Even when the hydraulic pumps are connected with the actuators in open circuit, the speeds of the actuators are controlled by the displacement volumes of the hydraulic pumps to conserve energy.

In this type of hydraulic circuit apparatus, proposals have been made to use a circuit apparatus including at least first and second hydraulic pumps of the variable displacement type, a first hydraulic actuator arranged for hydraulic connection with the first pump through first valve means to be driven thereby, and a second hydraulic actuator arranged for selective hydraulic connection with the first and second pumps through second and third valve means respectively to be driven thereby. In a control system for this hydraulic circuit apparatus, the order of priority for hydraulic connection is set beforehand in such a manner that when an operation signal for the second actuator is received while the first pump is inoperative, the first pump takes priority over the second pump for hydraulic connection with the second actuator, and when an operation signal for the first actuator is received while the first pump is in hydraulic connection with the second actuator, the first actuator takes priority over the second actuator for hydraulic connection with the first pump and the second actuator is brought into hydraulic connection with the second pump. The displacement volume of the first pump and switching of the second valve means are controlled in such a manner that when the first pump which is in hydraulic connection with the second actuator is to be brought into hydraulic connection with the first actuator, the displacement volume of the first pump is once returned to zero before changing of the hydraulic connection. Also, the displacement volume of the second pump and switching of the third valve means are controlled in such a manner that hydraulic connection between the second actuator and the second pump takes place when the first pump is switched from the second actuator to the first actuator for hydraulic connection.

Thus, if an operation signal for the first actuator is supplied when the first pump is in hyraulic connection with the second actuator, then the displacement volume of the first pump is first returned to zero, and when the volume has become zero, the second actuator is switched from the first pump to the second pump for hydraulic connection while the second pump starts its displacement, so that the inflow of the hydraulic fluid into the second actuator shows a change. This causes a change in the speed of the second actuator to occur, thereby influencing operability. Particularly when the second actuator is a swing motor or track motors, the brake is temporarily applied thereto and trouble may occur.

Furthermore, when the displacement volume of the first pump is first returned to zero, it is necessary that the displacement volume have a rate of change such that the change takes place gradually so as not to give a shock to the working elements or machines driven by the second actuator. Thus, the time elapsing after a decrease in the displacement volume of the first pump is initiated until it reaches zero is relatively long, so that it takes a considerably long period of time for the first actuator to be brought into hydraulic connection with the first pump and driven thereby after an operation signal for the first actuator is supplied.

SUMMARY OF THE INVENTION

Accordingly, an object of the invention is to provide a control system for a hydraulic circuit apparatus capable, when an operation signal for the first actuator is supplied while the first hydraulic pump is in hydraulic connection with the second actuator, of switching the first hydraulic pump from the second actuator to the first actuator for hydraulic connection while keeping the inflow of the pressure fluid into the second actuator substantially constant in amount.

Another object of the invention is to provide a control system for a hydraulic circuit apparatus capable, when an operation signal for the first actuator is supplied while the first hydraulic pump is in hydraulic connection with the second actuator, of bringing the first hydraulic pump into hydraulic connection with the first actuator in a relatively short period of time to drive same.

According to the invention, there is provided a control system for a hydraulic circuit apparatus including at least first and second hydraulic pumps of the variable displacement type, a first hydraulic actuator arranged for hydraulic connection with said first pump through first valve means to be driven thereby, and a second hydraulic actuator arranged for selective hydraulic connection with said first and second pumps through second and third valve means, respectively, to be driven thereby, wherein the order of priority for hydraulic connection is set beforehand in such a manner that when an operation signal for the second actuator is received while the first pump is inoperative, the first pump takes priority over the second pump for hydraulic connection with the second actuator, and when an operation signal for the first actuator is received while the first pump is in hydraulic connection with the second actuator, the first actuator takes priority over the second actuator for hydraulic connection with the first pump and the second actuator is brought into hydraulic connection with the second pump, and the displacement volume of the first pump and switching of the second valve means are controlled in such a manner that when the first pump which is in hydraulic connection with the second actuator is to be brought into hydraulic connection with the first actuator, the displacement volume of the first pump is once returned to zero before changing fo the hydraulic connection. The control system comprises: first means for judging whether or not the first pump is in hydraulic connection with the second actuator when the operation signal for the first actuator is received, and generating a command for backing up reduction in the inflow of hydraulic fluid into the second actuator simultaneously when the displacement volume of the first pump begins to be returned to zero, when it is judged that the first pump is in hydraulic connection with the second actuator; second means for generating a command for switching the third valve means to an open position in accordance with the backup command from the first means; and third means for generating a command for initiating a displacement of the second pump in accordance with the backup command from the first means.

Preferably, the control system further comprises fourth means for generating a command, in accordance with the backup command from the first means, for rendering the absolute value of a rate of change in the displacement volume of the first pump upon returning to zero and the absolute value of a rate of change of the displacement volume of the second pump after starting of its displacement substantially equal to each other and larger than maximum rates of change in the displacement volume of the first and second pumps during normal operation thereof.

Preferably, the third means includes means for deciding target displacement volumes for the first and second pumps based on the operation signal for the second actuator, for selecting the decided target displacement volume as a target displacement volume of the first pump in the absence of the backup command from the first means, and means for selecting zero as a target displacement volume of the first pump and the decided target displacement volume as a target displacement volume of the second pump in the presence of the backup command from the first means.

Preferably, the fourth means includes first and second means for generating preset maximum rates of changes in the displacement volume of the first and second pumps during normal operation thereof, respectively, third means for generating preset rates of change in the displacement volume fo the first and second pump during backing-up operation thereof larger than the preset maximum rates of change during normal operation, means for selecting the preset rates of change generated by the third means as maximum rates of change in the displacement volume of the first and second pumps in the presence of the backup command from the first means, and means for inverting one of the selected preset rates to take a negative value.

BRIEF DESCRIPTION OF THE DRAWINGS

FIG. 8 is a circuit diagram of the backup command circuit of the control system shown in FIG. 1;

FIG. 9 is a view of the relationship between the input and output of the logic circuit shown in FIG. 8;

FIG. 14 is a circuit diagram of the valve drive circuit of the control system shown in FIG. 4;

DESCRIPTION OF THE PREFERRED EMBODIMENTS

Figure 1:
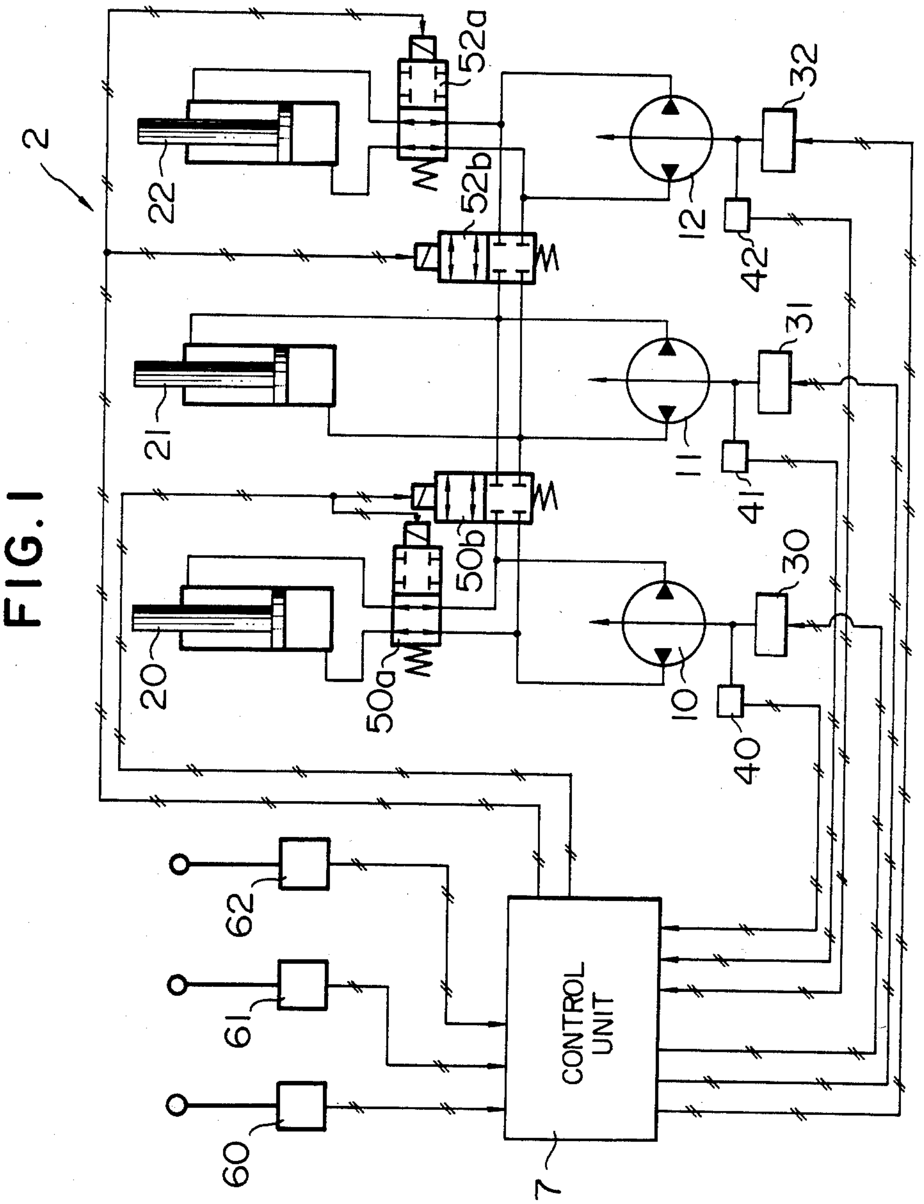
FIG. 1 is a view of a hydraulic circuit apparatus and a control system for effecting control of the speeds and directions of movements of the actuators by the displacement volumes and directions of the hydraulic pumps.

Referring to FIG. 1, a hydraulic excavator in which the speeds and directions of movements of actuators are controlled by the displacement volumes and directions of hydraulic pumps is generally designated by the reference numeral 2. The hyraulic circuit apparatus comprises hydraulic pumps 10, 11, 12 of the double tilting, variable displacement type an arm cylinder 20 driven by the pump 10, a boom cylinder 21 driven by the pumps 10, 11 and 12, and a bucket cylinder 22 driven by the pump 12. Hydraulic connection between the hydraulic pump 10 and the arm cylinder 20 is controlled by on-off valves 50*a* and 50*b*; the hydraulic pump 11 is directly connected with the boom cylinder 21; and hydraulic connection between the hydraulic pump 12 and the cylinders 22 and 21 is controlled by on-off valves 52*a* and 52*b*. The hydraulic pumps 10, 11 and 12 have their swash plate positions or displacement volumes adjusted by swash plate drive means 30, 31 and 32 and detected by displacement meters 40, 41 and 42, respectively. The speeds and directions of movements of the cylinders 20, 21 and 22 are indicated by operation lever means 60, 61 and 62. Output signals of the displacement meters 40, 41 and 42 and the operation lever means 60, 61 and 62 are supplied to a control unit 7 where the hydraulic connection priority order for the cylinders 20, 21 and 22 with the pumps 10, 11 and 12 is judged and target swash plate positions of the hydraulic pumps 10, 11 and 12 are determined. The control unit 7 supplies control signals to the swash plate drive means 30, 31 and 32 and feeds switch signals to the on-off valves 50*a*, 50*b*, 52*a* and 52*b*. In the embodiment FIG. 1 and the control unit 7 is in the form of an electronic circuit. In the interest of brevity, flushing circuits and other circuits are omitted in the illustrated hydraulic circuit apparatus. In FIG. 1 the pumps 10, 11 and 12 have the same maximum displacement volume, and the cylinder 21 has a maximum required flow rate which is twice the maximum displacement volume of the pumps 10, 11 and 12 while the cylinders 21 and 22 have a maximum required flow rate which is equal to the maximum displacement volume of the pumps 10, 11 and 12.

Figure 2:
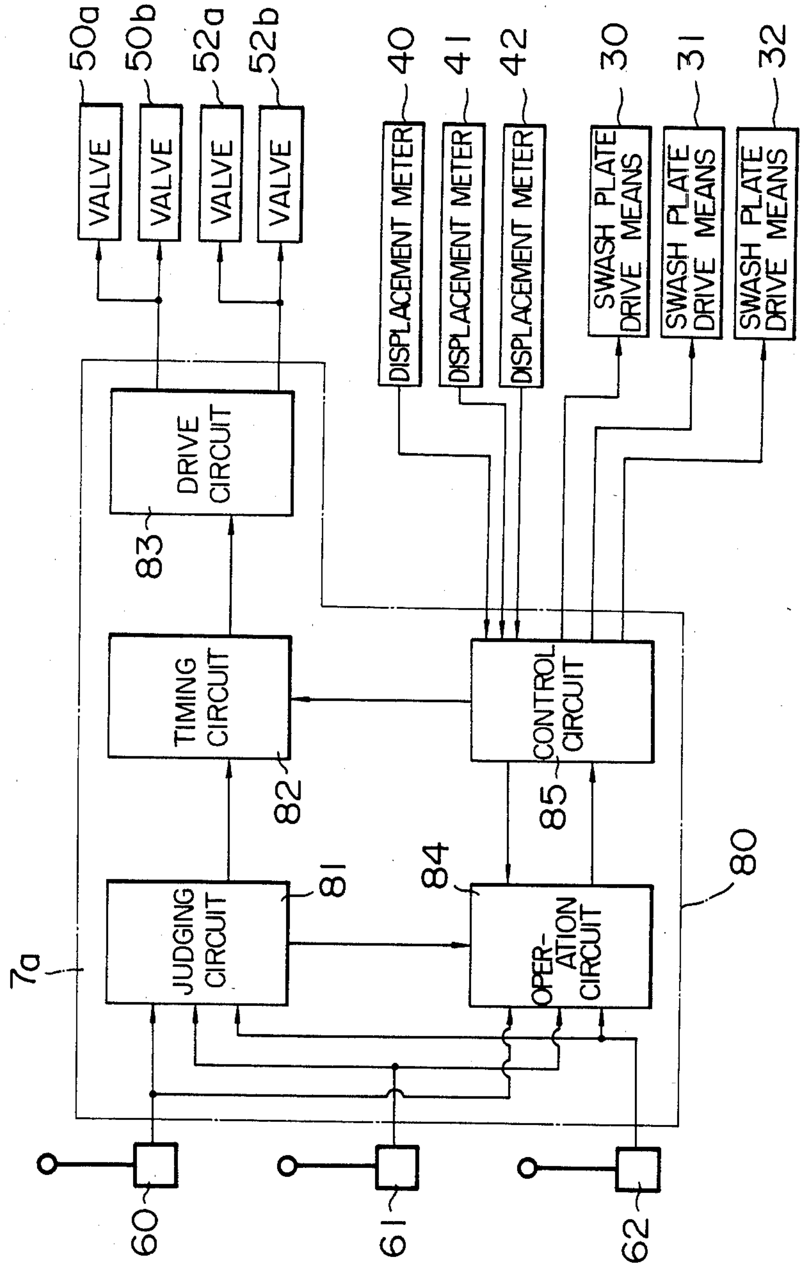
FIG. 2 PRIOR ART
FIG. 2 is a view of a control system of the prior art.
Figure 3:
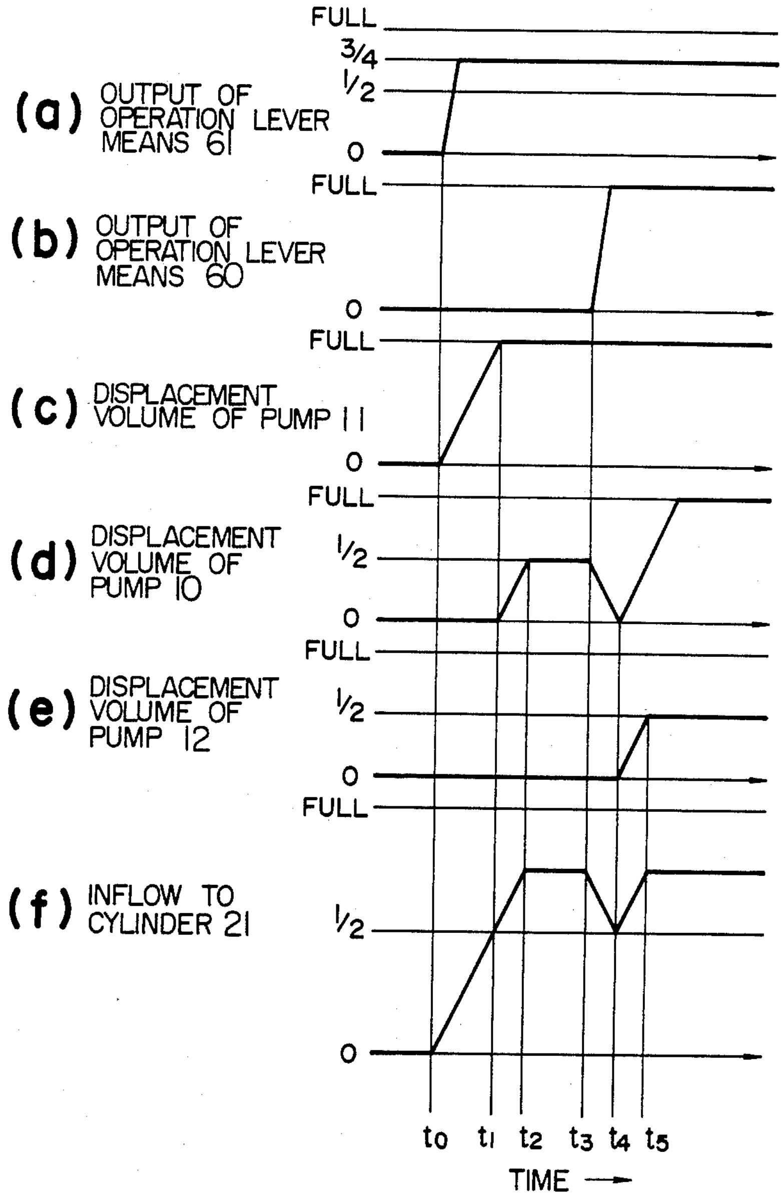
FIG. 3 PRIOR ART
FIG. 3 is a time chart showing the operation of the control system of the prior art shown in FIG. 2.

Before describing the control unit 7 according to the invention in detail, the construction and operation of a control unit of the prior art will be outlined by referring to FIGS. 2 and 3 to facilitate understanding of the control unit 7 according to the invention.

In FIG. 2, a control unit of the prior art is generally designated by the reference numeral 80 and comprises a judging circuit 81 operative to judge the order of priority for hydraulic conjection between the cylinders 20, 21 and 22 and the pumps 10, 11 and 12 based on signals from operation lever means 60, 61 and 62, an operation circuit 84 for determining target swash plate positions for the hydraulic pumps 10, 11 and 12 based on signals from the operation lever means 60, 61 and 62 and a signal from the judging circuit 81, a control circuit 85 for producing control signals supplied to swash plate drive means 30, 31 and 32 based on target swash plate position signals from the operation circuit 84 and signals from the displacement meters 40, 41 and 42, a timing circuit 82 operative to take timing and produce switching signals for the on-off valves 50*a*, 50*b*, 52*a* and 52*b* based on a signal from the judging circuit 81 and a control signal from the control circuit 85, and a drive circuit 83 operative to switch the on-off valves 50*a*, 50*b*, 52*a* and 52*b* by switching signals from the timing circuit 82. The pump 11 is exclusively used for driving the cylinder 21. The pump 10 takes priority for hydraulic connection with the cylinder 20, and the pump 12 takes priority for hydraulic connection with the cylinder 22. The pump 10 takes priority over the pump 12 for hydraulic connection with the cylinder 21. In the hydraulic excavator if the cylinders 20, 21 and 22 are suddenly actuated, a shock of high order is applied to the machine body and it becomes impossible to operate same. Thus, the control circuit 85 effects control of the maximum swash plate speed so as to keep the swash plate speeds of the pumps 10, 11 and 12 from becoming higher than a predetermined level even if the operation speed of the operation lever means 60, 61 and 62 is high, to thereby avoid the acceleration of the cylinders 20, 21 and 22 becoming higher than a predetermined level.

Operation of the control unit 80 will be described by referring to the time chart shown in FIG. 3. If the operation lever means 61 alone is manipulated at a time $t_o$ to $\frac{3}{4}$ the maximum stroke, then the judging circuit 81 passes judgment that the cylinder 21 should be brought into hydraulic connection with the pump 11 at a first stage and with the pump 10 at a second stage, respectively. Upon receipt of this signal, the operation circuit 84 increases the target swash plate position for the pump 11 from time $t_o$, and the control circuit 85 effects control of the swash plate of the pump 11 while effecting maximum swash plate speed control. This increases the displacement volume of the pump 11 as shown in FIG. 3(*c*). As the displacement volume of the pump 11 is maximized at time $t_1$, the operation circuit 84 increases the target swash plate position for the pump 10 from time $t_1$, and the control circuit 85 effects control of the swash plate of the pump 10 in accordance with the target swash plate position signal while effecting maximum swash plate speed control, so that the displacement volume of the pump 10 increases as shown in FIG. 3(*d*). As the displacement volume of the pump 10 reaches $\frac{1}{2}$ its maximum at time $t_2$, the operation circuit 84 holds the target swash plate position for the hydraulic pump 10 at $\frac{1}{2}$ its maximum, and therefore, the displacement volume of the pump 10 is kept at $\frac{1}{2}$ the maximum. As a result, the inflow of hydraulic fluid into the cylinder 21 or the speed thereof increases from time $t_o$ to time $t_2$ as shown in FIG. 3(*f*). If the operation lever means 60 is manipulated at time $t_3$ while the cylinder 21 is driven as aforesaid, the judging circuit 81 passes judgment that the pump 10 and the pump 12 should be brought to hydraulic connection with the cylinders 20 and 21, respectively. If the on-off valves 50*a*, 50*b*, 52*a* and 52*b* are suddenly switched at this time, the machine body would have a shock of high order applied thereto as a result of a sudden change in the speeds of the cylinders 20 and 21. To avoid this trouble, the operation circuit 84 performs operations and produces a signal to bring the swash plate of the hydraulic pump 10 to a zero or neutral position at time $t_4$. If the swash plate of the hydraulic pump 10 becomes neutral, the timing circuit 82 supplies a signal for opening the on-off valve 50*a* and closing the on-off valve 50*b* and a signal for closing the on-off valve 52*a* and opening the on-off valve 52*b*. At the same time, the operation circuit 84 determines the target swash plate positions of the hydraulic pumps 10 and 12 in accordance with signals from the operation lever means 60 and 61, and the control circuit 85 increases the displacement volumes of the hydraulic pumps 10 and 12 based on the target swash plate position signal. As a result, the inflow of hydraulic fluid into the cylinder 21 decreases from time $t_3$ to time $t_4$ and increases from time $t_4$ to $t_5$ as shown in FIG. 3(*f*).

If the operation lever means 60 is manipulated when the operation lever 61 alone is being manipulated, then the inflow of hydraulic fluid into the cylinder 21 shows a change as described above, so that the speed of the cylinder 21 undergoes a change and operability is adversely affected. Particularly, when the cylinder 21 is replaced by a swing motor or track motors, the brake is temporarily applied. Also, it is necessary that the swash plate speed be reduced from time $t_3$ to time $t_4$ so as to keep the working elements and machine body from being subjected to shock. The result of this is that an idle time between $t_3$ and $t_4$ that would elapse after the operation lever means 60 is manipulated until the cylinder 20 is actuated would be long.

The present invention has been developed for the purpose of obviating the aforesaid problem of the prior art.

Figure 4:
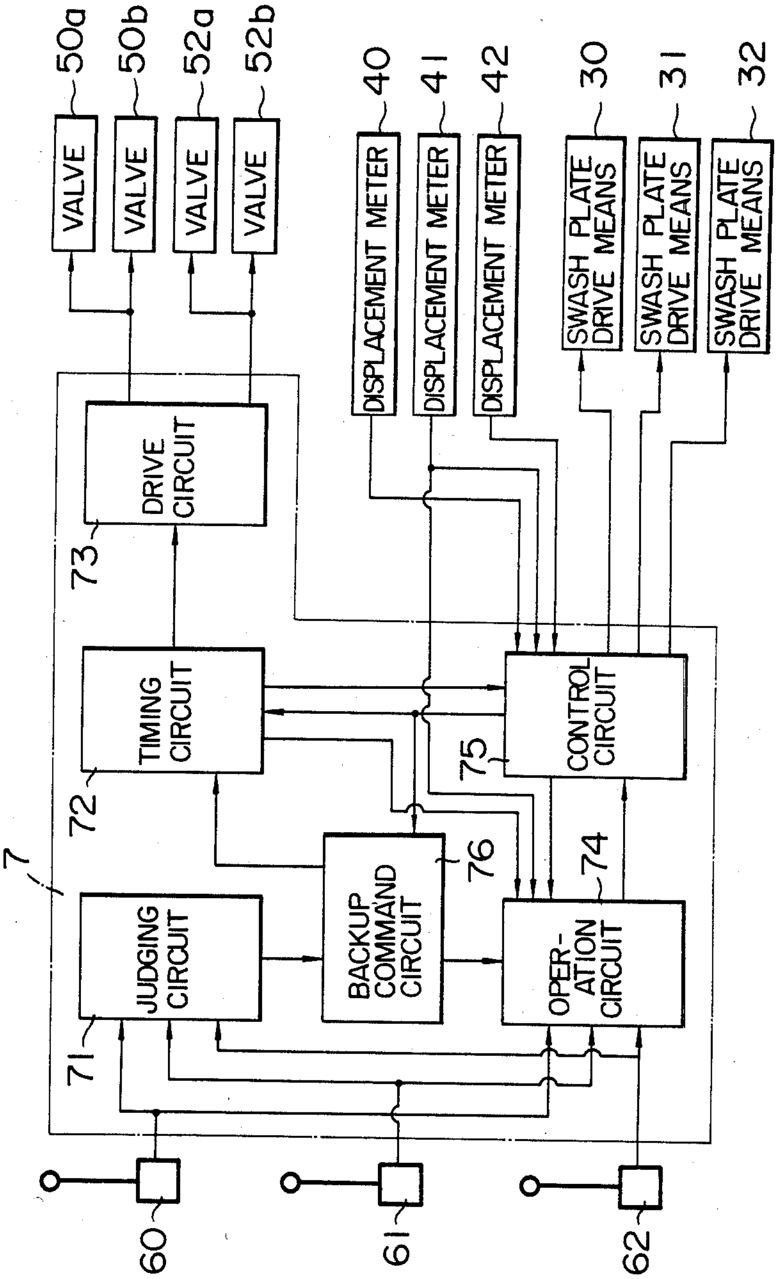
FIG. 4 is a view of the control system comprising one embodiment of the invention.

As shown in FIG. 4 the control unit 7 comprises a hydraulic connection priority order judging circuit 71, a valve switching timing circuit 72, a valve drive circuit 73, an operation circuit 74 for determing the target swash plate positions for the pumps, a control circuit 75 and a backup command circuit 76 with the 71, 72, 73, 74 and 75 being respectively substantially similar in operation to the circuits 81, 82, 83, 84 and 85 of the control unit 80 of FIG. 2.

The backup command circuit 76 normally receives a signal from the judging circuit 71 and supplies the same to the operation circuit 74 and the timing circuit 72. If a command to operate the cylinder 20 is received when the hydraulic pumps 10, 11 are in hydraulic connection with the cylinder 21 or a signal for switching the hydraulic pump to be hydraulically connected with the cylinder 21 from the hydraulic pump 10 to the hydraulic pump 12 is received, then the backup command circuit 76 gives a command to the operation circuit 74 to produce a signal for returning the swash plate position of the pump 10 to neutral and increase the swash plate position of the hydraulic pump 12. Also, the backup command circuit 76 gives a command to the timing circuit 72 to produce a signal for closing the on-off valve 52*a* and open the on-off valve 52*b* and gives a command to the control circuit 75 through the timing circuit 72 to produce a signal for increasing the swash plate speeds of the pumps 10 and 12 while rendering them equal to each other. Stated differently, the backup command circuit 76 gives a command to simultaneously produce a signal for reducing the displacement volume of the pump 10, a signal for increasing the displacement volume of the pump 12 and a signal for closing the on-off valve 52*a* and opening the on-off valve 52*b*. These operations are finished when a signal for the swash plate position of the hydraulic pump 10 is received from the control circuit 75 and the swash plate of the hydraulic pump 10 has become neutral.

Figure 5:
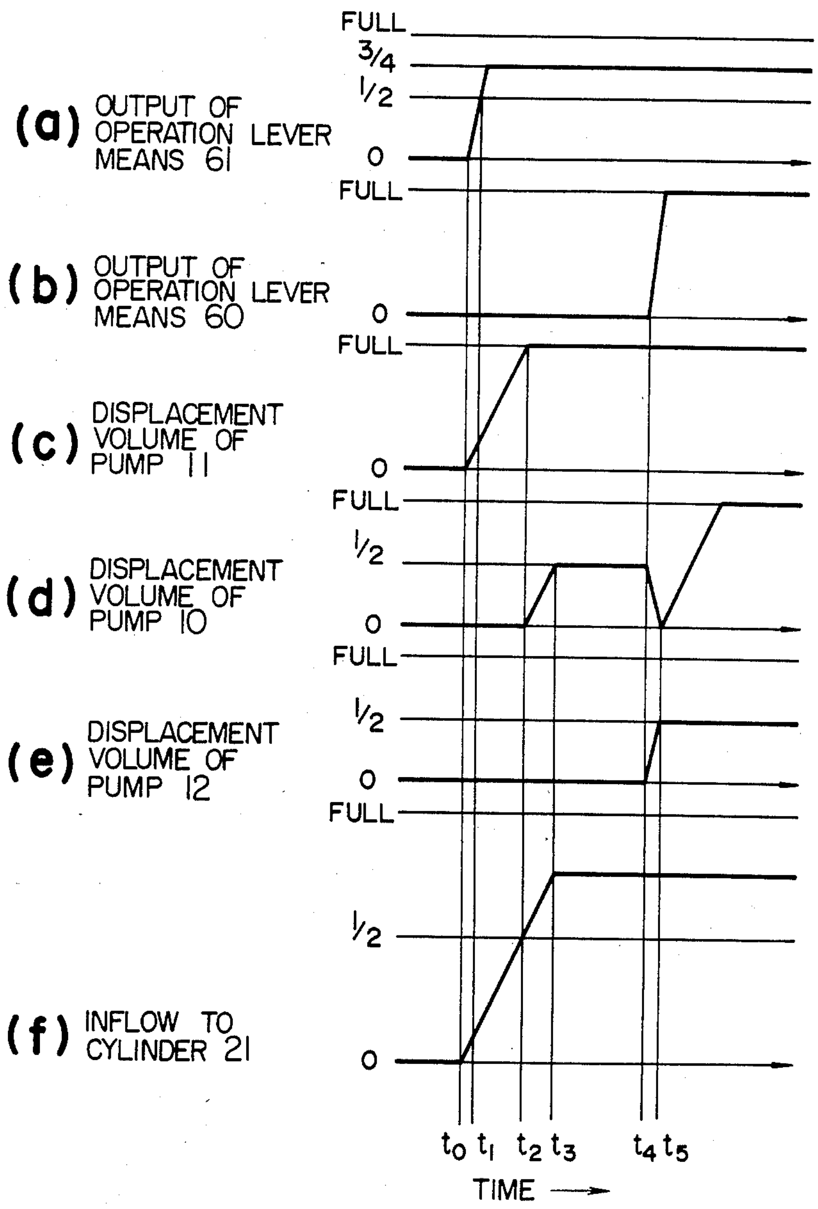
FIG. 5 is a time chart showing the operation of the control system shown in FIG. 4.

As shown in FIG. 5 at time $t_o$, the operation lever means 61 alone is manipulated to $\frac{3}{4}$ the maximum stroke of the operation lever means 61. As in the prior art, the displacement volume of the pump 11 increases through time $t_1$ and is maximized at time $t_2$, and then the displacement volume of the pump 10 increases. Thus, the inflow of hydraulic fluid into the cylinder 21 increases as shown in FIG. 5(*f*). If the operation lever means 60 is manipulated when the cylinder 21 is in this condition at time $t_4$, then the judging circuit 71 passes judgment that the pump 10 and the pump 12 should be brought to hydraulic connection with the cylinders 20 and 21, respectively. Receiving this signal, the backup command circuit 76 gives a command to the operation circuit 74 to produce a signal for returning the swash plate of the hydraulic pump 10 to a neutral position and produce a signal for increasing the swash plate position of the pump 12. At the same time, the backup command circuit 76 gives a command to the timing circuit 72 to produce a signal for closing the on-off valve 52*a* and opening the on-off vavle 52*b*. The backup command circuit 76 also gives a command to the control circuit 75 through the timing circuit 72 to produce a signal for increasing the swash plate speeds of the pumps 10 and 12 while rendering them equal to each other. Thus, the on-off valve 52*a* is closed and on-off valve 52*b* is opened at time $t_4$, and at the same time, as shown in FIGS. 5(*d*) and 5(*e*), the displacement volume of the pump 10 decreases and the displacement volume of the pump 12 increases. At this time, the displacement volumes of the pumps 10 and 12 have the same rate of change and the change takes place quickly. Since at time $t_4$ the pumps 10 and 12 are in hydraulic connection with the cylinder 21 and the displacement volumes of the pumps 10 and 12 have the same rate of change, the inflow of hydraulic fluid into the cylinder 21 shows no changes as shown in FIG. 5(*f*). When the swash plate of the pump 10 returns to a neutral position or when time $t_5$ is attained at which the displacement volume of the pump 10 becomes zero, the backup command circuit 76 opeates normally and opens the on-off valve 50*a* and closes the on-off valve 50*b* while the displacement volume of the pump 10 increases. This actuates the cylinder 20. In this case, the swash plate speed is high between time $t_4$ and time $t_5$, so that the idle time $t_4 - t_5$ is short after the operation lever means 60 is manipulated until the cylinder 20 is actuated. From time $t_4$ to time $t_5$, the cylinder 21 is in hydraulic connection with the pumps 10 and 12 which have the same rate of change in displacement volume. Thus, the inflow of hydraulic fluid into the cylinder undergoes no change, and needlesss to say, no shock is exerted on the machine body even if the rate of change in the displacement volumes of the pumps 10 and 12 is increased.

Figures 6, 7:
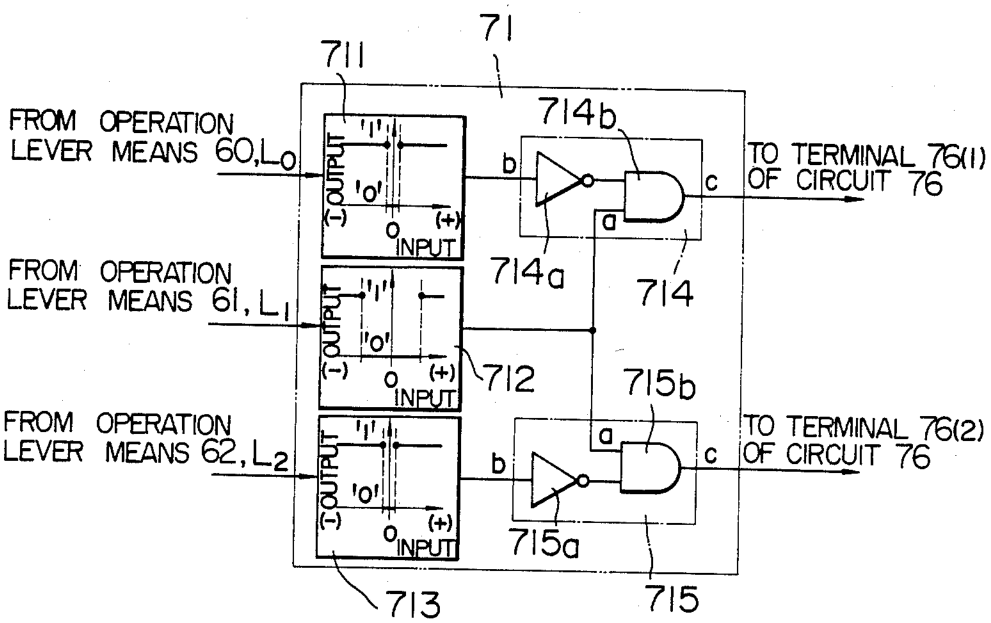
FIG. 6 is a circuit diagram of the hydraulic connection priority order judging circuit of the control system shown in FIG. 4.
FIG. 7 is a table showing the relation between the input and the output of the logic circuit shown in FIG. 6.

As shown in FIG. 6, in the control unit 7, the judging circuit 71 for determining the order of priority for hydraulic connection comprises, a window comparator 711 having inputted thereto an operation signal $L_o$ produced by the operation lever means 60 and producing, as an output signal, a signal '0' when the operation signal $L_o$ is zero or in a dead zone and a signal '1' in other conditions, a window comparator 712 having inputtted thereto an operation signal $L_1$ produced by the operation lever means 61 and producing, as an output signal, a signal '0' when the absolute value of the operation signal $L_1$ is $\frac{1}{2}$ the maximum value or smaller than that and a signal '1' in other conditions, and a window comparator 713 having inputted thereto an operation signal $L_2$ produced by the operation lever means 62 and producing as an output signal a signal '0' when the operation signal $L_2$ is zero or in the dead zone and a signal '1' in other conditions. The output signals of the window comparators 712 and 711 are supplied to input terminals a and b of the logic circuit 714, respectively, which produces from its output terminal c an output signal which is supplied to a first input terminal 76 (1) of the backup command circuit 76. The output signals of the window comparators 712 and 711 are supplied to terminals a and b of a logic circuit 715, respectively, which produces at its output terminal c an output signal which is supplied to a second input terminal 76 (2) of the backup command circuit 76. The logic circuit 714 and 715 respectively comprise NOT circuits 714*a* and 715*a* each having an input terminal b, and AND circuits 714*b* and 715*b* each having an input terminal a, input terminals respectively connected to the NOT circuits 714*a* and 715*a* and an output terminal c. As shown in FIG. 7, the logic circuits 714 and 715 produce a signal '1' only when the output of the window comparator 712, supplied to the input terminal a, is '1' and produces a signal '0' in other conditions.

As shown in FIG. 8, the backup command circuit 76 comprises a lead 761 for supplying as an output thereof an output signal of the logic circuit 714 of the judging circuit 71 supplied through the terminal 76 (1) to a first input terminal 72 (1) of the timing circuit 72 and a first input terminal 74 (1) of the operation circuit 74, and a logic circuit 762 receiving through a and b terminals output signals of the logic circuits 714 and 715 of the judging circuit 71 transmitted through the terminals 76 (1) and 76 (2) and supplying output signals from a c terminal to a second input terminal 72 (2) of the timing circuit 72 and a second input terminal 74 (2) of the operation circuit 74. The logic circuit 762 comprises a NOT circuit 762*a* having an input terminal a and an AND circuit 762*b* having an input terminal b and another input terminal connected to the NOT circuit 762*a*. As shown in FIG. 8, the logic circuit 762 produces as an output a signal '1' when the output of the logic circuit 715 supplied to the input terminal b is '1' and produces a signal '0' in other conditions.

Figures 10, 11:
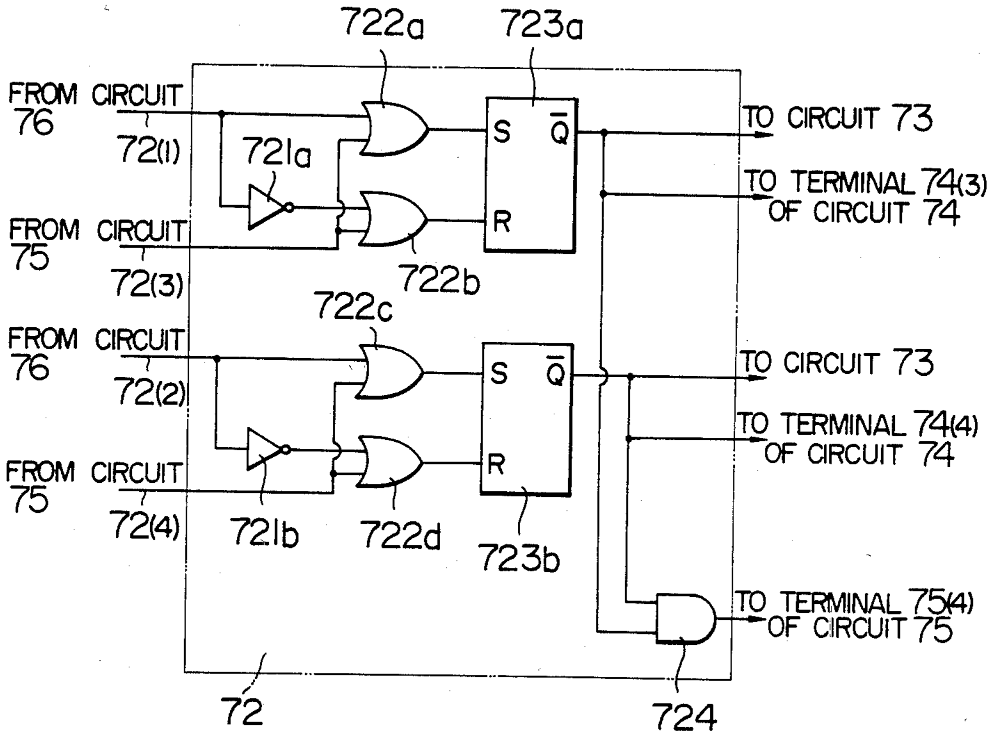
FIG. 10 is a circuit diagram of the valve switching timing circuit of the control system shown in FIG. 4.
FIG. 11 is a table showing the relation between the input and the output of RS flip-flop circuit of the timing circuit shown in FIG. 10.

The timing circuit 72 comprises, as shown in FIG. 10, an OR circuit 722*a* having inputted thereto an output signal of the lead 761 of the backup command circuit 76 transmitted through the first input terminal 72 (1) and an output signal of a window comparator 751*a*, described hereinbelow, of the control circuit 75 transmitted through a third input terminal 72 (3), a NOT circuit 721*a* for inverting the output signal of the lead 761 of the backup command circuit 76, and an OR circuit 722*b* having inputted thereto an output signal of the NOT circuit 731*a* and an output signal of the window comparator 751*a* of the control circuit 75. Output signals of the OR circuits 722*a* and 722 *b* are respectively inputted to E and R terminals of an RS flip-flop circuit 723*a* which supplies from its $\overline{Q}$ terminal an output signal to a first input terminal 73 (1) of the valve drive circuit 73 and a third input terminal 74 (3) of the operation circuit 74. The timing circuit 72 comprises an OR circuit 722*c* having inputted thereto an output signal of the logic circuit 762 of the backup command circuit 76 transmitted through a second input terminal 72 (2) and an output signal of a window comparator 751*c*, described hereinbelow of the control circuit 75 transmitted through a fourth input terminal 72 (4), a NOT circuit 721*b* for inverting an output signal of the logic circuit 762 of the backup command circuit 76, and an OR circuit 722*d* having inputted thereto an output signal of the NOT circuit 721*b* and an output signal of the window comparator 751*c* of the control circuit 75. Output signals of the OR circuits 722*c* and 722 *d* are respectively inputted to S and R terminals of an RS flip-flop circuit 723*b* which supplies from its $\overline{Q}$ terminal an output signal to a second input terminal 73 (2) of the valve drive circuit 73 and a fourth input terminal 74 (4) of the operation circuit 74. As shown in FIG. 11, the RS flip flop circuits 723*a* and 723*b* each produces a signal '0' at the $\overline{Q}$ terminal when the input to the S terminal is '0' and the input to the R terminal is '1', produces a signal '1' at the $\overline{Q}$ terminal when the input to the S terminal is '1' and the input to the R terminal is '0 ', and the output of the $\overline{Q}$ terminal is kept in the previous state when the inputs to the terminals S and R are both '1'.

The timing circuit 72 further comprises an AND circuit 724 having inputted thereto the $\overline{Q}$ terminal outputs of the RS flip-flop circuits 723*a* and 723*b* and producing an output signal which is supplied to a fourth input terminal 75 (4) of the control circuit 75.

Figure 12:
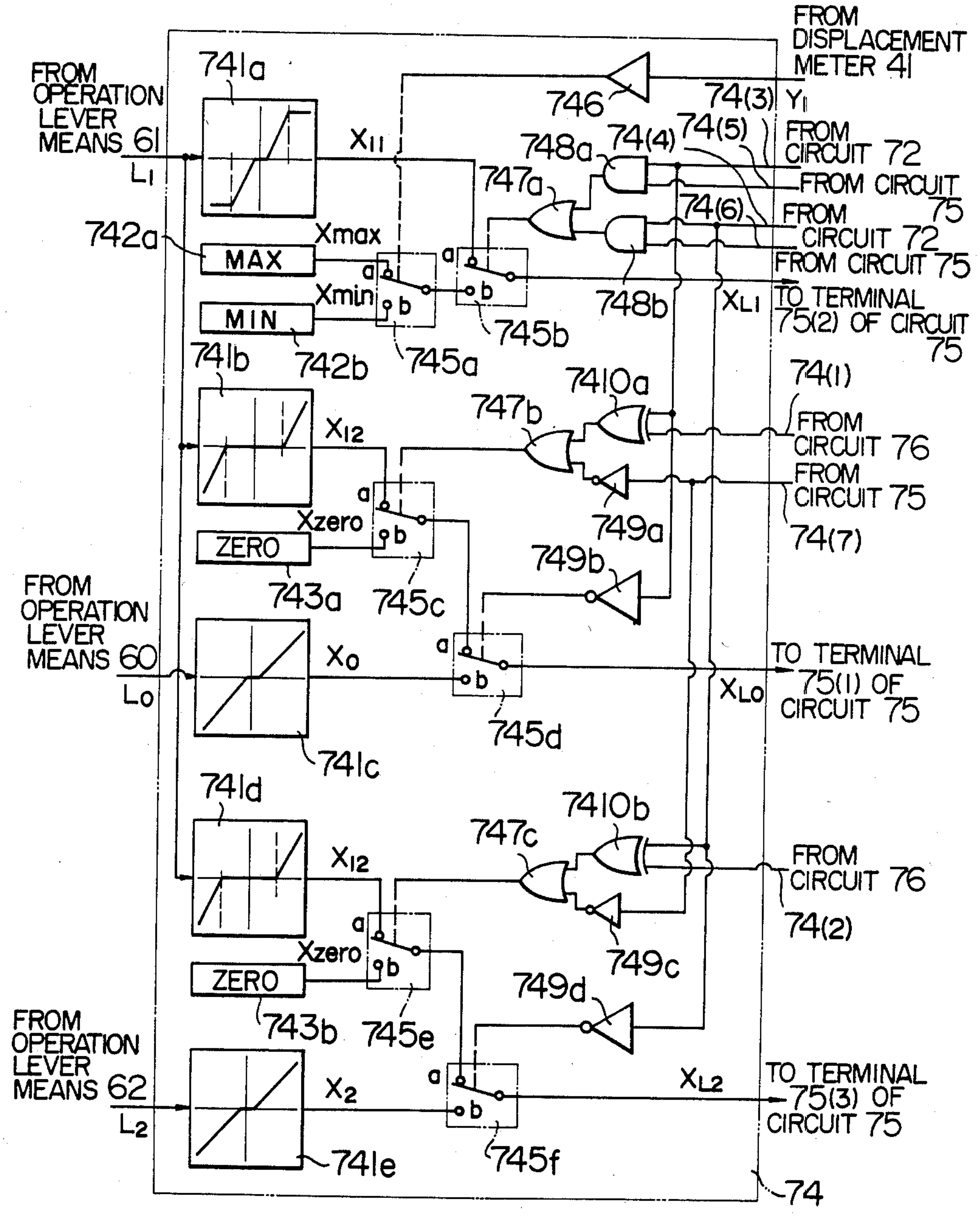
FIG. 12 is a circuit diagram of the operation circuit for determining a target swash plate position of the control system shown in FIG. 4.

The operation circuit 74 comprises, as shown in FIG. 12, a first function generator 741*a* having inputted thereto the operation signal $L_1$ of the operation lever means 61 for generating a signal $X_{11}$ indicating a target swash plate position for the pump 11, a second function generator 741*b* having inputtted thereto the operation signal $L_1$ of the operation lever means 61 for generating a signal $X_{12}$ indicating a target swash plate position for the hydraulic pump 10, a third function generator 741*d* having inputted thereto the operation signal $L_1$ of the operation lever means 61 for generating a signal $X_{12}$ indicating a target swash plate position for the pump 12, a fourth function generator 741*c* having inputted thereto the operation signal $L_o$ of the operation lever means 60 for generating a signal $X_o$ indicating a target swash plate position for the hydraulic pump 10, a fifth function generator 741*e* having inputted thereto an operation signal $L_2$ of the operation lever means 62 for generating a signal $X_2$ indicating a target swash plate position for the pump 12, a first generator 742*a* for generating a signal $X_{max}$ indicating a maximum swash plate position for the pump 11, a second generator 742*b* for generating a signal $X_{min}$ indicating a minimum swash plate position (negative maximum swash plate position) for the pump 11, a third generator 743*a* for generating a signal $X_{zero}$ indicating a zero swash plate position (swash plate neutral position) for the pump 10, and a fourth generator 743*b* for generating a signal $X_{zero}$ indicating a zero swash plate position (swash plate neutral position) for the pump 12.

The first function generator 741*a* is set such that its output signal $X_{11}$ has the following values: when the operation signal $L_1$ is zero or in the dead zone, it indicates zero; when the operation signal $L_1$ is between the upper limit of the dead zone and $\frac{1}{2}$ the maximum value of $L_1$, it increases in linear proportion to an increase in $L_1$; when the operation signal $L_1$ is between the lower limit of the dead zone and $\frac{1}{2}$ the minimum value (the absolute value is maximum in negative) of $L_1$, it decreases in linear proportion to a decrease in $L_1$; when the operation signal $L_1$ is $\frac{1}{2}$ the maximum value or greater than that, it indicates a predetermined maximum value; and when the operation signal $L_1$ is $\frac{1}{2}$ the minimum value or smaller than that, it indicates a predetermined minimum value.

The second and fourth function generators 741*b* and 741 *d* are set such that their output signal $X_{12}$ has the following values: when the operation signal $L_1$ is between $\frac{1}{2}$ the maximum value and $\frac{1}{2}$ the minimum value, it indicates zero; when $L_1$ is $\frac{1}{2}$ the maximum value or greater than that, it increases in linear proportion to an increase in $L_1$ and at the same rate of increase in $X_{11}$ in the first function generator 741*a*; and when $L_1$ is $\frac{1}{2}$ the minimum value or smaller than that, it decreases in linear proportion to a decrease in $L_1$.

The third function generator 741*c* is set such that its output signal $X_o$ has the following values: when the operation signal $L_o$ is zero or in the dead zone, it indicates zero; when $L_o$ is greater than the upper limit of the dead zone, it increases in linear proportion to an increase in $L_o$; and when $L_o$ is smaller than the lower limit of the dead zone, it decreases in linear proportion to a decrease in $L_o$.

The fifth function generator 741*e* is set such that its output signal $X_2$ is in the same functional relation to the operation signal $L_2$ as the functional relation of the operation signal $X_o$ of the fourth function generator 741*c* to the operation signal $L_o$.

In the first function generator 741*a*, the predetermined maximum value signal $X_{11}$ generated when the operation signal $L_1$ reaches or becomes greater than $\frac{1}{2}$ the maximum value substantially corresponds to the output signal $X_{max}$ of the first generator 742*a* indicating the maximum swash plate position for the pump 11, and the predetermined minimum value signal $X_{11}$ generated when the operation signal $L_1$ reaches or becomes smaller than $\frac{1}{2}$ the minimum value substantially corresponds to the output signal $X_{min}$ of the second generator 742*b*.

One of the output signals $X_{11}$, $X_{max}$ and $X_{min}$ of the first function generator 741*a*, first generator 742*a* and second generator 742*b*, respectively, is selected by switches 745*a* and 745*b* and supplied to a second input terminal 75 (2) of the control circuit 75 as a target swash plate position command signal $X_{L1}$ for the pump 11. One of the output signals $X_{12}$, $X_o$ and $X_{zero}$ of the second function generator 741*b*, fourth function generator 741*d* and third generator 743*a*, respectively, is selected by switches 745*c* and 745*d* and supplied to a first terminal 75 (1) of the control circuit 75 as a target swash plate position command signal $X_{Lo}$ for the pump 10. One of the output signals $X_{12}$, $X_2$ and $X_{zero}$ of the third function generator 741*d*, fifth function generator 741*e* and fourth generator 743*b*, respectively, is selected by switches 745e and 745f and supplied to the third input terminal 75 (3) of the control circuit 75 as a target swash plate position command signal $X_{L2}$ for the pump 12.

The switch 745a is actuated by a comparator 746, which has inputted thereto an output signal $Y_1$ of the displacement meter 41, and produces a signal '0' when $Y_1 \geqq 0$ to move the switch 745a to the a terminal side to select $X_{max}$, and produces a signal '1' when $Y_1 < 0$ to move the switch 745a to the b terminal side to select $X_{min}$.

The switch 745b is actuated by an OR circuit 747a and AND circuits 748a and 748b. The AND circuit 748a is connected to third and fifth input terminals 74 (3) and 74 (5) and has inputted thereto a $\overline{Q}$ terminal output of the RS flip-flop circuit 723a of the timing circuit 72 and an output of the window comparator 751a of the control circuit 75. The AND circuit 748b is connected to fourth and sixth input terminals 74 (4) and 74 (6), and has inputted thereto a $\overline{Q}$ terminal output of the RS flip-flop circuit 734b of the timing circuit 72 and an output of the window comparator 751c of the control circuit 75. The OR circuit 747a has inputted thereto outputs of the AND circuits 748a and 748b and supplies an actuation signal to the switch 745b which is positioned, when the actuation signal is '0', on the a terminal side to select $X_{11}$ and positioned, when the actuation signal is '1', on the b terminal side to select $X_{min}$.

The switch 745c is actuated by an OR circuit 747b, a NOT circuit 749a and an EXOR circuit 7410a. The EXOR circuit 7410a is connected to the first and third terminals 74 (1) and 84 (3) and has inputted thereto an output of the lead 761 of the backup command circuit 76 and a $\overline{Q}$ terminal output of the RS flip-flop circuit 723a of the timing circuit 72. The NOT circuit 749a is connected to a seventh terminal 74 (7) and has inputted thereto an output of a window comparator 751b, described hereinbelow, of the control circuit 75. The OR circuit 747b has inputted thereto outputs of the EXOR circuit 7410a and NOT circuit 749a and supplies an actuation signal to the switch 745c which is positioned, when the actuation signal is '0', on the a terminal side to select $X_{12}$ and positioned, when the signal is "1", on the b terminal side to select $x_{zero}$.

The switch 745d is actuated by a NOT circuit 749b which is connected to the third input terminal 74 (3) to have inputted thereto a $\overline{Q0}$ terminal output of the RS flip-flop circuit 723a of the timing circuit 72 and supply an actuation signal to the switch 745d. The switch 745d is positioned, when the actuation signal is '0', on the a terminal side to select $X_{12}$ or $X_{zero}$ and switched, when the signal is '1', to the b terminal side to select $X_o$.

The switch 745e is actuated by an OR circuit 747c, a NOT circuit 749e and an EXOR circuit 7410b. The EXOR circuit 7410b is connected to the second and third input terminals 74 (2) and 74 (4) and has inputted thereto an output of a logic circuit 762 of the backup command circuit 76 and a $\overline{Q}$ terminal output of the RS flip-flop circuit 723b of the timing circuit 72. The NOT circuit 749c is connected to the seventh input terminal 74 (7) and has inputted thereto an output of the window comparator 751b of the control circuit 75. The OR circuit 747c has inputted thereto outputs of the EXOR circuit 7410b and NOT circuit 749c and supplies an actuation signal to the switch 745e which is positioned, when the signal is '0', on the a terminal side to select $X_{12}$ and positioned, when it is '1', on the b terminal side to select $X_{zero}$.

The switch 745f is actuated by a NOT circuit 749d which is connected to the fourth input terminal 74 (4) to have inputted thereto a $\overline{Q}$ terminal output of the RS flip-flop circuit 723b of the timing circuit 72 and supply an actuation signal to the switch 745f. The switch 745f is positioned, when the actuation signal is '0', on the a terminal side to select $X_{12}$ or $X_{zero}$ and positioned, when it is '1', on the b terminal side to select $X_2$.

Figure 13:
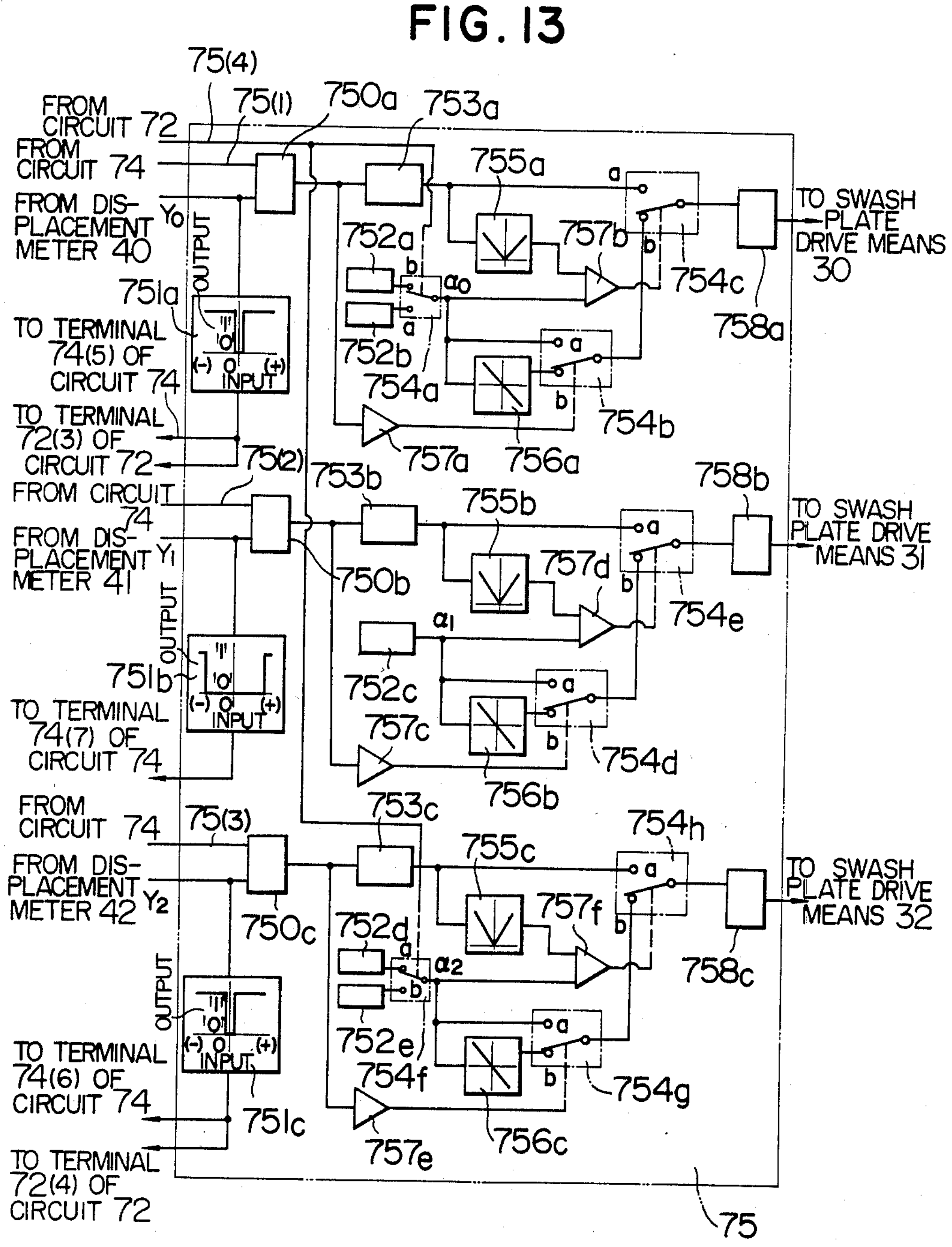
FIG. 13 is a circuit diagram of the tilting control circuit of the control system shown in FIG. 4.

As shown in FIG. 13, the control circuit 75 comprises a deductor 750a having inputted thereto a target swash plate position command signal $X_{Lo}$ for the pump 10 supplied through the first input terminal 75 (1) from the switch 745d of the operation circuit 74 and an output signal $Y_o$ of the displacement meter 40 and comparing the two inputs for calculating $\Delta X_o = X_{Lo} - Y_o$, a deductor 750b having inputted thereto a target swash plate position command signal $X_{L1}$ for the pump 11 supplied through the second input terminal 75 (2) from the switch 745b of the operation circuit 74 and an output signal $Y_1$ of the displacement meter 41 and comparing the two inputs for calculating $\Delta X_1 = X_{L1} - Y_1$, and a deductor 750c having inputted thereto a target swash plate position command signal $X_{L2}$ for the hydraulic pump 12 supplied through the third input terminal 75 (3) from the switch 745f of the operation circuit 74 and an output signal $Y_2$ of the displacement meter 42 and comparing the two inputs for calculating $\Delta X_2 = X_{L2} - Y_2$.

The control circuit 75 has the window comparators 751a, 751b and 751c having respectively inputted thereto the output signals $Y_o$, $Y_1$ and $Y_2$ of the displacement meters 40, 41 and 42. An output signal of the window comparator 751a is supplied to the third input terminal 72 (3) of the timing circuit 72 and the fifth input terminal 74 (5) of the operation circuit 74. An output signal of the window comparator 751b is supplied to the seventh input terminal 74 (7) of the operation circuit 74, and an output of the window comparator 751c is supplied to the fourth input terminal 72 (4) of the timing circuit 72 and the sixth input terminal 74 (6) of the operation circuit 74.

The comparators 751a and 751c each produce '0' as an output when the output signals $Y_o$ and $Y_1$ of the displacement meters 40 and 42 are zero or in the dead zone and produce '1' as an output in other conditions. The window comparator 751b produces '1' as an output when the output signal $Y_1$ of the displacement meter 41 indicates a maximum value $Y_{max}$ or a minimum value $Y_{min}$ and produces '0' as an output in other conditions.

The control circuit 75 further comprises a first generator 752a for generating a signal indicating a maximum swash plate tilting speed for the pump 10 in normal operation time, a second generator 752b for generating a signal indicating a maximum swash plate tilting speed for the pump 10 in backup operation time, and a differentiator 753a having inputted thereto an output signal $\Delta X_o$ of the deductor 750a for producing $(d\Delta X_o)/(dt)$ or $\Delta X_o$ as an output. The output signals of the first and second generators 753a and 753b are selected by the switch 754a and one of them is chosen as a final maximum swash plate tilting speed signal $\alpha_o$. The switch 754a is actuated by an output signal of the AND circuit 724 of the timing circuit 72 supplied to the fourth input terminal 75 (4) and positioned, when the signal is '0', on the a terminal side to select the normal maximum speed of the first generator 752a as a signal $\alpha_o$ and positioned, when it is '1', on the b terminal side to select the backup maximum speed of the second generator 752b as a signal $\alpha_o$. A switch **754*b* selects one of the selected maximum swash plate tilting signal $\alpha_o$ and a signal obtained by inverting the signal $\alpha_o$ by an inverter circuit 756*a* to change its sign from positive to negative. The switch 754*b* is actuated by a comparator 757*a* which has inputted thereto an output signal $\Delta X_o$ of the deductor 750*a* and produces '1' when $\Delta X_o \geqq 0$ to move the switch 754*b* to the a terminal side to select the signal $\alpha_o$ as it is and move the switch 754*b***, when $\Delta X_o < 0$, to the b terminal side to select $-\alpha_o$.

A switch **754*c* selects one of the output signal $\Delta\dot{X}_o$ of the differentiator 753*a* and the maximum swash plate tilting speed signal $\Delta_o$ or $-\alpha_o$ selected by the switch 754*b*. The switch 754*c* is actuated by a comparator 757*b* which has inputted thereto an output $|\Delta\dot{X}_o|$ of an absolute value circuit 755*a* having the output signal $\Delta\dot{X}_o$ of the differentiator 753*a* inputted thereto and the maximum swash plate tilting speed signal $\alpha_o$ selected by the switch 754*a* and compares the two inputs, to produce '1' when $|\Delta\dot{X}_o| < \alpha_o$ to move the switch to the a terminal side to select $|\Delta\dot{X}_o|$ and produce '0' when $|\Delta\dot{X}_o| \geqq \alpha_o$ to move the switch 754*c*** to the b terminal side to select $\alpha_o$ or $-\alpha_o$.

The signal selected by the switch **754*c* is amplified by an amplifier 758*a* and supplied to the swash plate drive means 30**.

The control circuit 75 further comprises a third generator **752*c* for generating a signal $\alpha_1$ indicating a maximum swash plate tilting speed for the pump 11 in normal operation condition usually substantially equal to the maximum speed set by the first generator 752*a*, and a differentiator 753*b* having inputted thereto an output signal $\Delta X_1$ of the deductor 750*b* for calculating $(d\Delta X_1)/(dt)$ or $\Delta\dot{X}_1$. The signals $\alpha_1$ and $\Delta\dot{X}_1$ are processed by a circuit portion including switches 754*e* and 754*d*, absolute value circuit 755*b*, inverter circuit 756*b*, and comparators 757*c* and 757*d*** of the same construction and connection as a circuit portion described hereinabove for processing the signals $\Delta_o$ and $\Delta\dot{X}_o$.

The signal selected by the switch **754*e* is amplified by an amplifier 758*b* and supplied to the swash plate drive means 31**.

The control circuit 75 further comprises a fourth generator **752*d* for generating a signal indicating a maximum swash plate tilting speed for the pump 10 in normal operating condition which is usually substantially equal to the maximum speed set by the first generator 752*a*, a fifth generator 752*e* for generating a signal indicating a maximum swash plate tilting speed for the pump 12 in backup operation time which is substantially equal to the maximum backup speed set by the second generator 752*b*, and a differentiator 753*c* having inputted thereto an output signal $\Delta X_2$ of the deductor 750*c* for calculating $(d\Delta X_2)/(dt)$ or $\Delta\dot{X}_2$. A switch 754*f* selects one of the output signals of the fourth and fifth generators 752*d* and 752*e* as a final maximum swash plate tilting speed signal $\Delta_2$ for the pump 12. The signals $\alpha_2$ and $\Delta\dot{X}_2$ are processed by a circuit portion including switches 754*g* and 754*h*, absolute value circuit 755*c*, inverter circuit 756*c* and comparators 757*e* and 757*f*** of the same construction and connection as a circuit portion described hereinabove for processing the signals $\alpha_o$ and $\Delta\dot{X}_o$.

The signal selected by the switch **754*h* is amplified by an amplifier 758*c* and supplied to the swash plate drive means 32**.

The valve drive circuit 73 comprises, as shown in FIG. 14, a transistor amplifier **731*a* having inputted thereto the $\overline{Q}$ terminal output of the RS flip-flop circuit 723*a* of the timing circuit 72 transmitted through a first input terminal 73 (1) and amplifying the same, and a transistor amplifier 731*b* having inputted thereto the $\overline{Q}$ terminal output of the RS flip-flop circuit 723*b* of the timing circuit 72 transmitted through the second input terminal 73 (2) and amplifying the same. The signal amplified by the amplifier 731*a* is supplied to an actuating section for the valves 50*a* and 50*b*, and the signal amplified by the amplifier 731*b* is supplied to an actuating section for the valves 52*a* and 52*b***.

Operation of the control unit 7 of the aforesaid construction will be described in detail by referring to the time chart shown in FIG. 5 again.

Inoperative

The operation signals $L_o$, $L_1$ and $L_2$ of the operation lever means 60, 61 and 62 are all zero, so that the outputs of the window comparators 711, 712 and 713 of the judging circuit 71 are all '0', and the outputs of the logic circuits 714 and 715 are also '0'. In the backup command circuit 76, the outputs of the lead 761 and logic circuit 762 are both '0'.

Meanwhile, the outputs $Y_o$, $Y_1$ and $Y_2$ of the displacement meters 40, 41 and 42 are all zero, so that the window comparators **751*a*, 751*b* and 751*c* of the control circuit 75 have '0' outputs. Thus, in the timing circuit 72, inputs to the first to fourth input terminals 72 (1), 72 (2), 73 (3) and 72 (4) are all '0' and the S terminal inputs of the RS flip-flop circuits 723*a* and 723*b* are both '0' while the R terminal inputs are both '1', so that the $\overline{Q}$ terminal outputs are both '0'. The outputs of the AND circuit 724** is also '0'.

In the operation circuit 74, the inputs to the third to sixth input terminals 74 (3), 74 (4), 74 (5) and 74 (6) are all '0', so that the AND circuits **748*a* and 748*b* both produce '0' outputs and the output of the OR circuit 747*a* is also '0'. Thus, the switch 745*b* is on the a terminal side and the output $X_{11}$ of the first function generator 741*a* is selected and supplied to the second input terminal 75 (2) of the control circuit 75 as a target swash plate position command signal $X_{L1}$. At this time, the operation signal $L_1$ is zero, so that the output $X_{11}$ is also zero or neutral. The inputs to the third and fourth input terminals 74 (3) and 74 (4) are both '0', so that the NOT circuits 749*b* and 749*d* both produce '1' outputs and move the switches 745*d* and 745*f* to the b terminal side. Thus, the outputs $X_o$ and $X_2$ of the fourth and fifth function generators 741*c* and 741*e* are selected and supplied to the first and third input terminals 75 (1) and 75 (3) of the control circuit 75**, respectively, as target swash plate position command signals $X_{Lo}$ and $X_{L2}$. At this time, the operation signals $L_o$ and $L_2$ are both zero, so that the utputs $X_{Lo}$ and $X_{L2}$ are zero or neutral.

In the control circuit 75, inputs to the deductors **750*a*, 750*b* and 750*c* are all zero, so that their outputs are all zero and the outputs $\Delta\dot{X}_o$, $\Delta\dot{X}_1$ and $\Delta\dot{X}_2$ of the differentiators 753*a*, 753*b* and 753*c* are all zero. In the comparators 757*b*, 757*d* and 757*f*, the inputs have the relationship $|\Delta\dot{X}_o| < \alpha_o$, $|\Delta\dot{X}_1| < \alpha_1$ and $|\Delta\dot{X}_2| < \alpha_2$, so that their outputs are '1'. Thus, the switches 754*c*, 754*e* and 754*h* are all on the a terminal side and $\Delta\dot{X}_o$, $\Delta\dot{X}_1$ are $\Delta\dot{X}_2$ selected. Thus, the outputs of the amplifiers 758*a*, 758*b* and 758*c* are all zero and the swash plate drive means 30, 31 and 32 remain inoperative, to keep the swash plates of the hydraulic pumps 10, 11 and 12** zero or in neutral position.

In the valve drive circuit 73, the inputs to the first and second input terminals 73 (1) and 73 (2) are both '0', so that the outputs of the amplifiers 731*a* and 731*b* are both zero. Thus, the valves 50*a*, 50*b*, 52*a* and 52*b* are held in their inoperative positions shown in FIG. 1.

Time $t_o$-Time $t_1$

If the maximum value of the operation signal $L_1$ for the operation lever means 61 is '1', then $0<L_1<\frac{1}{2}$ and the operation signals $L_o$ and $L_2$ of the operation lever means 60 and 62 remain zero, so that the outputs of the window comparator 711, 712 and 713 remain '0' in the judging circuit 71. And the outputs $Y_o$ and $Y_2$ of the displacement meters 40 and 42 are zero and the output $Y_1$ of the displacement meter 41 is $0<Y_1<Y_{max}$, so that the outputs of the window comparators 715*a*, 715*b* and 715*c* also remain zero in the control circuit 75. Thus, in the operation circuit 74, the outputs $X_{11}$, $X_o$ and $X_2$ of the function generators 741*a*, 741*c* and 741*e* are selected as the target swash plate position command signals $X_{L1}$, $X_{Lo}$ and $X_{L2}$ and supplied to the second, first and third input terminals 75 (2), 75 (1) and 75 (3), respectively, of the control circuit 75, as is the case with the inoperative conditions of the system. However, the operation signal $L_1$ being $0<L_1<\frac{1}{2}$, the output $X_{11}$ of the function generator 741*a* indicates a target swash plate position which increases in linear proportion to an increase in $L_1$. The outputs $X_o$ and $X_2$ of the other function generators 741*c* and 741*e* indicate zero or neutral.

In the control circuit 75, calculation is done on $\Delta X_1=X_{L1}-Y_1$ in the deductor 750*b* and on $\Delta\dot{X}_1$ in the differentiator 753*b*. With $\Delta X_1>0$, the comparator 757*c* supplies an output '1' to move the switch 754*d* to the a terminal side and select the set maximum speed $\alpha_1$ as it is. With $|\Delta\dot{X}_1|>\alpha_1$, the comparator 757*d* supplies an output '0' to move the switch 754*e* to the b terminal side and selects $\alpha_1$ and supplies same to the amplifier 758*b*. Thus, the swash plate drive means 31 starts operation and the swash plate position speed or the displacement volume of the pump 11 increases while the tilting speed is limited to the value of the set speed $\alpha_1$. The swash plate positions of the other pumps 10 and 12 are held in zero or neutral position. Thus, the cylinder 21 is driven only by the displacement volume of the pump 11 at a substantially constant acceleration which is restricted by $\alpha_1$.

In the timing circuit 72, the $\overline{Q}$ terminal outputs of the RS flip-flop circuits 723*a* and 723*b* are both '0', so that the valves 50*a*, 50*b*, 52*a* and 52*b* are held in inoperative positions as is the case with the inoperative conditions of the system.

Time $t_1$-Time $t_2$

The operation signal $L_1$ of the operation lever means 61 becomes $\frac{1}{2}\leqq L_1\leqq\frac{3}{4}$ and the operation signals $L_o$ and $L_2$ remain zero. Thus, in the judging circuit 71, the output of the window comparator 712 becomes '1' and the outputs of the window comparators 711 and 713 remain '0'. Consequently, the outputs of the logic circuits 714 and 715 both become '1'. In the backup command circuit 76, the output of the lead 761 becomes '1' and the output of the logical circuit 762 remains '0'.

Meanwhile, the outputs $Y_o$ and $Y_2$ of the displacement meters 40 and 42 remain zero, and the output $Y_1$ of the displacement meter 41 is $0<Y_1<Y_{max}$, so that the outputs of the window comparators 751*a*, 751*b* and 751*c* of the control circuit 75 remain zero. Thus, in the timing circuit 72, the input to the first input terminal 72 (1) is '1' and the inputs to the second to the fourth input terminals 72 (2)–72 (4) are '0'. Accordingly, the S terminal input and R terminal input to the RS flip-flop circuit 723*a* are '1' and '0', respectively, and the $\overline{Q}$ terminal output thereof becomes '1', and the S terminal input to the RS flip-flop circuit 723*b* is '0' and R terminal input thereto remains '0' and the $\overline{Q}$ terminal output '1' of the RS flip-flop circuit 723*a* is amplified by the amplifier 731*a* of the valve drive means 73 and supplied to the valves 50*a* and 50*b*, to switch the former to a closed position and the latter to an open position. This, the pump 10 is placed in condition for hydraulic connection with the actuator 21.

In the operation circuit 74, the input to the third input terminal 74 (3) is '1' and the input to the fifth input terminal 74 (5) is '0', so that the output of the AND circuit 748*a* is '0' and the inputs to the fourth and sixth input terminals 74 (4) and 74 (6) are both '0', so that the output of the AND circuit 748*b* is also '0'. Thus, the OR circuit 747 supplies '0' as an output and moves the switch 745*b* to the a terminal side while selecting the output $X_{11}$ of the function generator 741*a* as a target swash plate position command signal $X_{L1}$. The output $X_{11}$ of the function generator 741*a* indicates a maximum value $X_{max}$ because the operation signal $L_1$ is $\frac{1}{2}\leqq L_1\leqq\frac{3}{4}$.

With the input to the third input terminal 74 (3) being '1', the NOT circuit 749*b* supplies '0' as an output and moves the switch 745*d* to the a terminal side. The inputs to the first and third input terminals 74 (1) and 74 (3) being both '1', the EXOR circuit produces '0' as an output. The input to the seventh input terminal 74 (7) being '0', the NOT circuit 749*a* produces '1' as an output. Thus, the OR circuit 747*b* produces '1' as an output and moves the switch 745*c* to the b terminal side. Accordingly, the zero command $X_{zero}$ of the generator 743*a* is selected as a target swash plate position command signal $X_{Lo}$.

With the input to the fourth input terminal 74 (4) being '0', the NOT circuit 749*d* produces '1' as an output and moves the switch 745*f* to the b terminal side. Thus, the output $X_2$ of the function generator 741*e* is selected as a target swash plate position command signal $X_{L2}$. $X_2$ indicates zero or neutral.

In the control circuit 75, a signal is produced based on the target swash plate position command signal $X_{L1}$ for regulating the swash plate tilting speed to a value below $\alpha_1$, in the same manner as in time $t_o$ to time $t_1$. At this time, the signal $X_{L1}$ indicates a maximum value $X_{max}$. Thus, the swash plate position or the displacement volume of the pump 11 increases while the tilting speed is regulated to a value below $\alpha_1$, reaching a maximum value at time $t_2$. The swash plate positions of other pumps 10 and 12 are kept zero or neutral as is the case with time $t_o$-time $t_1$. Thus, the cylinder 21 continuous operation only by the displacement volume of the pump 11 at a substantially constant acceleration which is restricted by $\alpha_1$.

Time $t_2$-Time $t_3$

The operation signal $L_1$ of the operation lever means 61 indicates $\frac{3}{4}$ and the operation signals $L_o$ and $L_2$ remain zero, so that the output of the window comparator 712 of the judging circuit 71 is '1' and the outputs of the window comparators 711 and 713 thereof are '0'. Thus, the logic circuits 714 and 715 produce '1' as outputs while the output of the lead 761 of the backup command circuit 76 is '1' and the output of the logic circuit 762 thereof is '0', as is the case with time $t_1$-time $t_2$.

At time $t_2$ at which the swash plate position or the displacement volume of the pump 11 has just reached a maximum value, the pump discharge from the pump 10 is not yet initiated. Thus, the output $Y_o$ of the displacement meter 40 remains zero and the output $Y_1$ of the displacement meter 41 shows a maximum value $Y_{max}$ and the output $Y_2$ of the displacement meter 42 remains zero. Accordingly in the control circuit 75, the window comparators 751*a* and 751*c* produce '0' as outputs and the window comparator 761*b* produces '1' as an output.

In the timing circuit 72, the input to the first input terminal 72 (1) is '1' and the inputs to the second to fourth input terminals 72 (2), 72 (3) and 72 (4) are '0', so that the $\bar{Q}$ terminal outputs of the flip-flop circuits 723*a* and 723*b* become '1' and '0', respectively. The output of the AND circuit 724 is '0'.

In the operation circuit 74, the input to the third input terminal 74 (3) is '1' and the inputs to the fourth to sixth input terminals 74 (4), 74 (5) and 74 (6) are '0', so that the switch 754*b* is positioned on the a terminal side and the output signal $X_{11}$ of the function generator 741*a* indicating the maximum value $X_{max}$ is selected as a target swash plate position command signal $X_{L1}$, as is the case with time $t_1$-time $t_2$.

With the input to the third input terminal 74 (3) being '1', the NOT circuit 749*b* produces '0' as an output to move the switch 745*d* to the a terminal side. With the inputs to the first and third input terminals 74 (1) and 74 (3) being both '1', the EXOR circuit 7410*a* produces '0' as an output, and since the input to the seventh input terminal 74 (7) is '1', the NOT circuit 749*a* produces '0' as an output. Thus, the OR circuit 747*b* produces '0' as an output to move the switch 745*c* to the a terminal side. Thus, the output $X_{12}$ of the function generator 741*b* is selected as a target swash plate position command signal $X_{Lo}$ for the pump 10. The operation signal $L_1$ being $\frac{3}{4}$, the output $X_{12}$ of the function generator 741*b* indicates $\frac{1}{2}$ the maximum swash plate position $X_{max}$ of the pump 10, accordingly.

With the input to the fourth input terminal 74 (4) being '0', the switch 745*f* is positioned on the b terminal side and the output of the function generator 741*e* indicating zero is selected as a target swash plate position command signal for the hydraulic pump 12.

In the control circuit 75, the inputs $X_{L1}$ and $Y_1$ to the deductor 750*b* both show maximum values which are equal, so that its output becomes zero. Thus, the output $\Delta\dot{X}_1$ of the differentiator 753*b* also becomes zero and the switch 764*c* is positioned on the a terminal side, to supply a zero signal to the amplifier. Accordingly, the swash plate drive means 31 becomes inoperative and the swash plate of the hydraulic pump 11 is not driven but held in a maximum swash plate position.

The deductor 750*a* has inputted thereto the target swash plate position command signal $X_{Lo}$ indicating $\frac{1}{2}$ the maximum swash plate position and the output $Y_o$ of the displacement meter 40 of a value zero and calculates $\Delta X_o = X_{Lo} - Y_o$, and a calculation on $\Delta\dot{X}_o$ is carried out at the differentiator 753*a*. With the input to the fourth input terminal 75 (4) being '0', the switch 754*a* is positioned on the a terminal side and a signal of the generator 752*a* indicating the normal maximum speed is selected as a maximum speed signal $\alpha_o$. The comparator 767*b* produces '0' as an output because $|\dot{X}_o| > \alpha_o$ in normal operation condition of the operation lever means, to move the switch 754*c* to the b terminal side and select $\alpha_o$ for supplying same to the amplifier 758*a*. Thus, the swash plate drive means 30 starts operating and the hydraulic pump 10 begins to increase the swash plate position or the displacement volume while having the swash plate tilting speed limited to a maximum speed $\alpha_o$. The swash plate of the hydraulic pump 12 is held at zero. Thus, the cylinder 21 receives as an inflow thereinto the displacement volume of the pump 10 in addition to that of the pump 11, and continues to operate at a substantially constant acceleration which is restricted by $\alpha_o$ showing substantially the same value as $\alpha_1$.

When the increase in the swash plate position of the pump 10 is once started as aforesaid, the output $Y_o$ of the displacement meter 40 becomes $Y_o > 0$ in the control circuit 75, so that the output of the window comparator 751*a* becomes '1'. Thus, in the timing circuit 72, the input to the third input terminal 72 (3) becomes '1' but the S terminal input and the R terminal input to the RS flip-flop circuit 723*a* both become '1', so that the $\bar{Q}$ terminal holds the output '1' that has been supplied therefrom. In the operation circuit 74, the input to the fifth input terminal 75 (5) becomes '1'. Thus, the output of the AND circuit 748*a* becomes '1' and the output of the OR circuit 747*a* also becomes '1' to move the switch 745*b* to the b terminal side. The output $Y_1$ of the displacement meter 41 indicates $X_{max}$, so that $Y_1 \geqq 0$. Thus, the comparator 746 produces '0' as an output and moves the switch 745*a* to the a terminal side. Accordingly, the output $X_{max}$ of the generator 742*a* is selected as a target swash plate position command signal $X_{L1}$ for the pump 11, so that the swash plate position of the pump 11 is held at a maximum. The conditions of other signals are similar to those obtained at time $t_2$ at which the swash plate position of the pump 11 has just become maximum. Thus, the pump 10 continues the increase in the swash plate position while having the swash plate tilting speed limited to the value of $\alpha_0$ by the control circuit 75. Accordingly, the cylinder 21 continues operating by the displacement volumes of the pumps 10 and 11 at a constant acceleration which is restricted by $\alpha_o$.

As the swash plate position of the pump 10 reaches $\frac{1}{2}$ the maximum at time $t_3$, the output $Y_o$ of the displacement meter 40 indicates $\frac{1}{2}Y_{max}$, and at this time the target swash plate position command signal $X_{Lo}$ for the pump 10 indicates $\frac{1}{2}$ the maximum position $X_{max}$. Thus, the inputs to the deductor 750*a* become equal to each other and the output $\Delta X_o$ indicates zero to supply a zero signal to the amplifier 758*a* to thereby shut down the swash plate drive means 30. Thus, the pump 10 has its swash plate position held at $\frac{1}{2}$ the maximum value.

Time $t_3$-Time $t_4$

At time $t_3$-$t_4$, the signals are in the same conditions as the conditions in which they were placed when time $t_3$ was reached as described hereinabove. Thus, the swash plate position of the pump 11 is held at a maximum and the swash plate position of the pump 10 is held at $\frac{1}{2}$ the maximum value. Accordingly, the cylinder 21 is operated by the displacement volumes of the pumps 10 and 11 at a constant speed.

Time $t_4$-Time $t_5$

As the operation lever means 60 starts operating at time $t_4$, the operation signal $L_o$ indicates a value $L_o > 0$. Thus, in the judging circuit 71, the output of the window comparator 711 becomes '1' and the output of the window comparators 712 and 713 remain '1' and '0' respectively. Accordingly, the output of the logic circuit 714 becomes '0' and the output of the logic circuit 715 remains '1'.

In the backup command circuit 76, the output of the lead 761 becomes '0' and the output of the logic circuit 762 becomes '1'.

At time $t_4$, at which the operation lever means 60 has just started operating, the pump discharge from the pump 12 has not yet initiated. Thus, the output $Y_2$ of the displacement meter 42 is zero and, in the control circuit 75 the output of the window comparator 751*c* is '0' and the outputs of the window comparators 751*a* and 751*b* both remain '1'.

Thus, in the timing circuit t72, the inputs to the first and fourth input terminals 72 (1) and 72 (4) become '0' and the inputs to the second and third input terminals 72 (2) and 72 (3) become '1'. Thus, the S terminal and R terminal inputs to the RS flip-flop circuit 723*a* both become '1' while the $\overline{Q}$ terminal output thereof is held at '1' at which it has been held. The S terminal and R terminal inputs to the RS flip-flop circuit 723*b* become '1' and '0', respectively, while R terminal input becomes '0' and the $\overline{Q}$ terminal output becomes '1'. Thus, the valve 50*b* is held in a closed position and the valve 50*b* is held in an open position while the valve 52*a* is moved to a closed position and the valve 52*b* is moved to an open position. Accordingly, the pump 12 is also brought to a condition in which it is in hydraulic connection with the actuator 21. The inputs to the AND circuit 724 both become '1', so that its output becomes '1'.

In the operation circuit 74, the switches 745*a* and 745*b* are positioned on the a terminal and b terminal sides, respectively, and a signal of the generator 742*a* indicating the maximum position $X_{max}$ is selected as a target swash plate position command signal $X_{L1}$. Thus, the swash plate position of the pump 11 remains held at a maximum. The inputs to the first and third input terminals 74 (1), and 74 (3) being '0' and '1', respectively, the EXOR circuit 7410*a* produces '1' as an output. The input to the seventh input terminal 74 (7) being '1', the NOT circuit 749*a* produces '0' as an output. Thus, the OR circuit 747*b* produces '1' as an output and moves the switch 745*c* to the b terminal side. At this time, the switch 745*d* remains on the a terminal side, so that a signal $X_{zero}$ of the generator 743*a* indicating zero is selected as a target swash plate position command signal $X_{Lo}$ for the pump 10.

The input to the fourth input terminal 74 (4) being '1', the output of the NOT circuit 749*d* becomes '0'. Thus, the switch 745*f* is moved to the a terminal side. The inputs to the second and fourth input terminals 74 (2) and 74 (4) being both '1', the EXOR circuit 7410*b* produces '0' as an output. The input to the seventh input terminal 74 (7) being '1', the NOT circuit 749*c* also produces '0' as an output. Thus, the switch 745*e* is positioned on the a terminal side. Accordingly, an output $X_{12}$ of the generator is selected as a target swash plate position command signal $X_{L2}$ for the pump 12. The operation signal $L_1$ being $\frac{3}{4}$, the output $X_{12}$ for the function generator 741*d* indicates, as does the output $X_{12}$ of the function generator 741*b*, the value of $\frac{1}{2}$ the maximum swash plate position of the pump 12.

In the control circuit 75, the input to the fourth input terminal being '1', the switches 754*a* and 754*f* are both moved to the b terminal side, and signals generated by the generators 752*b* and 752*e*, indicating the maximum tilting speeds for the backup operation, are selected as maximum tilting speed signals $\alpha_o$ and $\alpha_2$. The target swash plate position command signal $X_{Lo}$ indicates $X_{zero}$, so that the output of the deductor 750*a* becomes $\Delta X_o = X_{Lo} - Y_o > 0$. Thus, the comparator 757*a* produces '0' as an output, and the switch 754*b* is moved to the b terminal side while $-\alpha_o$ is selected. With $|\Delta\dot{X}_o| > \alpha_o$ in normal operation lever operating condition, the comparator 757*b* produces '0' as an output and the switch 754*c* is positioned on the b terminal side. Thus, $-\alpha_o$ is selected as a tilting speed signal. Accordingly, the pump 10 begins to decrease its swash plate position while having the swash plate tilting speed limited to the value of $-\alpha_o$.

With the target swash plate position command signal $X_{L2}$ indicating $\frac{1}{2}$ the maximum position, the deductor 750*c* calculates $\Delta X2 = X_{L2} - Y_2$ and the result is $\Delta X_2 > 0$. Thus, the comparator 757*e* produces '1' as an output and the switch 764*g* moves to the a terminal while $\alpha_2$ is selected as it is. Also with $|\Delta\dot{X}_2| > \alpha_2$, the comparator 757*f* produces '0' as an output to move the switch 754*h* to the b terminal side. Thus, $\alpha_2$ is selected as a tilting speed signal. Accordingly, the pump 12 begins to increase the swash plate position while having the swash plate tilting speed limited to the value of $\alpha_2$.

Once the pump 12 begins to increase the swash plate position, the output $Y_2$ of the displacement meter 42 in the control circuit 75 becomes $Y_2 > 0$, so that the output of the window comparator 751*c* becomes '1'. Thus, in the timing circuit 72, the input to the fourth input terminal 72 (4) becomes '1'. However, the inputs to the S terminal and R terminal of the RS flip-flop circuit 723*b* both becomes '1', so that the $\overline{Q}$ terminal is maintained at '1'. In the operation circuit 74, the input to the sixth input terminal 74 (6) becomes '1' but no influences are exerted on the output of the OR circuit 747*a*, so that the maximum value signal of the generator 742*a* is continued to be selected as a target swash plate position command signal for the pump 11.

Consequently, the pump 11 continues operation in the maximum swash plate position and the pump 10 continues to decrease the swash plate position while having the swash plate tilting speed limited to the value of $-\alpha_o$. The pump 12 continues to increase the swash plate position while having the swash plate tilting speed limited to the value of $\alpha_2$. At this time $\alpha_o$ and $\alpha_2$ show back up maximum tilting speeds of the same value. Thus, there is no change in the inflow to the cylinder 21 representing a total of the displacement volumes, so that the cylinder 21 continues to operate at a substantially constant speed by the combined displacement volumes of the pumps 10, 11 and 12. Also since the backup maximum speed is set at a high value, the swash plate positions of the pumps 10 and 12 become zero and $\frac{1}{2}$ the maximum, respectively, in a short period of time.

Time $t_5$ and after

As the swash plate positions of the pumps 10 and 12 become zero and $\frac{1}{2}$ the maximum, respectively, at time $t_5$, the output $Y_o$ of the displacement meter 40 becoms zero in the control circuit 75, so that the output of the window comparator 751*a* becomes '0'. Thus, in the timing circuit 72, the input to the third input terminal 72 (3) becomes '0'. Accordingly, the input to the S terminal of the RS flip-flop circuit 723*a* becomes '0' while the input to the R terminal thereof remains '1', so that the $\overline{Q}$ terminal produces '0' as an output. The output of the AND circuit 724 becomes '0'.

In the valve drive circuit 73, the input to the amplifier 731*a* becomes '0' so that its output becomes zero, to move the valve 50*a* to an open position and the valve 50*b* to a closed position.

In the operation circuit 74, the input to the amplifier 731*a* becomes '0' so that its output becomes zero, to move the valve 50*a* to an open position and the valve 50*b* to a closed position.

In the operation circuit 74, the switches 745*a* and 745*b* remain on the a terminal and b terminal sides, respectively, so that the maximum value signal $X_{max}$ remains selected as a target swash plate position command signal $X_{L1}$ for the pump 11. The switches 745*e* and 745*f* both remain on the a terminal side, so that the output $X_{12}$ of the function generator 741*d* remains selected as a target swash plate position command signal $X_{L2}$ for the pump 12. Thus, the pump 11 is kept at a maximum displacement volume and the pump 12 is kept at ½ the maximum displacement volume, so that there is no change in the inflow to the cylinder 21 representing a total of the displacement volumes of the pumps 11 and 12.

The input to the third input terminal 74 (3) connected to the NOT circuit 749*b* becomes '0', so that the NOT circuit 749*b* produces '1' as an output to move the switch 745*d* to the b terminal side. Thus, the output $X_o$ of the function generator 741*c* is selected as a target swash plate position command signal $X_{Lo}$ for the pump 10. At this time, the operation lever means 60 is operative. Thus, if the maximum value of the operation signal $L_o$ is 1, then $0<L_o\leqq 1$ and the output $X_o$ of the function generator 741*c* shows a predetermined positive value in accordance with $L_o$.

In the control circuit 75, the input to the fourth input terminal 75 (4) is '0', so that the switch 754*a* is moved to the a terminal side and a signal generated by the generator 752*a* to indicate a maximum tilting speed for normal operation condition is selected as a maximum speed signal $\alpha_o$. In the deductor 750*a*, calculation is done on $\Delta X_o=X_{Lo}-Y_o$. In the differentiator 753*a*, calculation is done on $\Delta X_o$. With $\Delta X_o>0$, the comparator 757*a* produces '1' as an output to move the switch 754*b* to the a terminal side and select the maximum speed signal $\alpha_o$ as it is. With $|\Delta X_o|>0$, the comparator 757*b* produces '0' as an output to move the switch 754*c* to the b terminal side. Thus, the signal $\alpha_o$ indicating the maximum tilting speed for the normal operating condition is selected as a tilting speed signal and supplied to the amplifier 758*a*. Accordingly, the swash plate drive means 30 begins to operate and the pump 10 begins to increase the swash plate position or displacement volume while having the swash plate tilting speed limited to the value of the aforesaid $\alpha_o$.

Once the swash plate position of the pump 10 begins to increase, the output $Y_o$ of the displacement meter 40 becomes $Y_o>0$ in the control circuit 75, so that the window comparator 751*a* produces '1' as an output. Thus, in the timing circuit 72, the input to the third input terminal 72 (3) becomes '1'. However, the inputs to the S terminal and R terminal of the RS flip-flop circuit 723*a* both become '1', so that the output at the $\bar{Q}$ terminal is held at '0'. In the operation circuit 74, the input to the fifth input terminal 74 (5) connected to the AND circuit 748*a* also becomes '1'. However, no influence is exerted on the output of the OR circuit 747*a* and the switch 745*b* is held on the b terminal side. Thus, the pump 11 is held at its maximum displacement volume and pump 12 is held at ½ the maximum displacement volume as they have been, so that the cylinder 21 continues its operation at a constant speed by a total of the displacement volumes of the pumps 11 and 12. The pump 10 continuously increases the swash plate position while having the swash plate tilting speed to the value of $\alpha_o$, and the increase in the swash plate position stops when the target swash plate position indicated by the target swash plate position command signal $X_{Lo}$ is reached, to thereby hold the displacement volume constant.

In the foregoing description, the control unit 7 has been described by referring to its embodiment constituted as an electronic circuit shown in FIGS. 6–13. However, the invention is not limited to this specific form of embodiment of the control unit 7 and the control unit 7 can be constituted by a microcomputer.

Figure 15:
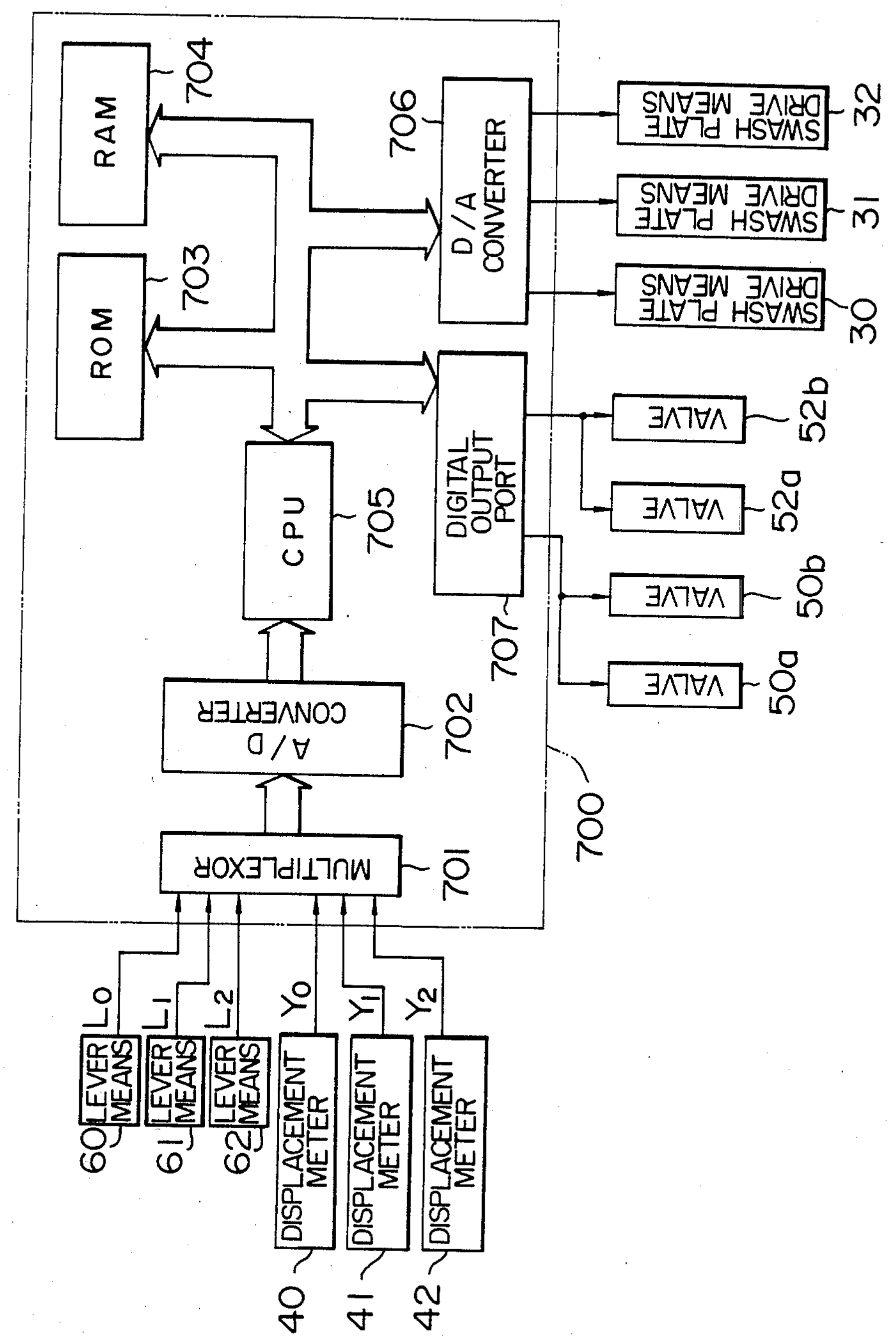
FIG. 15 is a block diagram of an embodiment of the invention in which the control system is realized by using a microcomputer.

More particularly as shown in FIG. 15, a control system generally designated by the reference numeral 700 comprises a multiplexor 701 for producing as its outputs the operation signals $L_o$, $L_1$ and $L_2$ of the operation lever means 60, 61 and 62 respectively and the output signals $Y_o$, $Y_1$ and $Y_2$ of the displacement meters 40, 41 and 42, respectively, by switching these signals, an A/D converter 702 for converting the signals $L_o$, $L_1$, $L_2$, $Y_o$, $Y_1$ and $Y_2$ which are analog signals to digital signals, an ROM memory 703 storing an operation procedure and also storing tables corresponding to the functions of $L_o$ and $X_o$, $L_1$ and $X_{11}$ and $X_{12}$ and $L_2$ and $X_2$ shown in FIG. 12 and values corresponding to the $\alpha_o$, $\alpha_1$ and $\alpha_2$ shown in FIG. 13, etc., a RAM memory 704 for storing the signals $L_o$, $L_1$, $L_2$, $Y_o$, $Y_1$ and $Y_2$ received from the A/D converter 702 and the values in the process of calculation, a CPU for doing calculating in the operation procedure stored in the ROM memory 703, a D/A converter 706 for converting to analog signals the digital signals for tilting the swash plates obtained by the calculation of the CPU 705 supplied to the swash plate drive means 30, 31 and 32, and a digital output port 707 for amplifying valve drive digital signals obtained by calculation by the CPU 705 and supplying same to the valves 50*a*, 50*b*, 52*a* and 52*b*.

Figure 16:
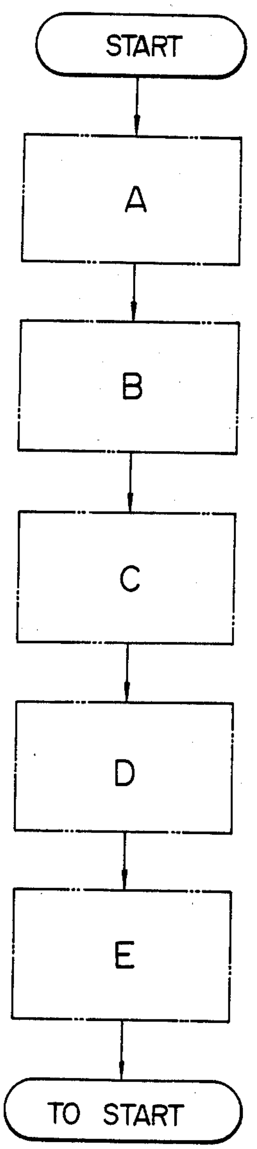
FIG. 16 is a view showing the operation procedure of the embodiment shown in FIG. 15 in its entirety, showing partial flow charts A, B, C, D and E being connected together into a whole.
Figure 17:
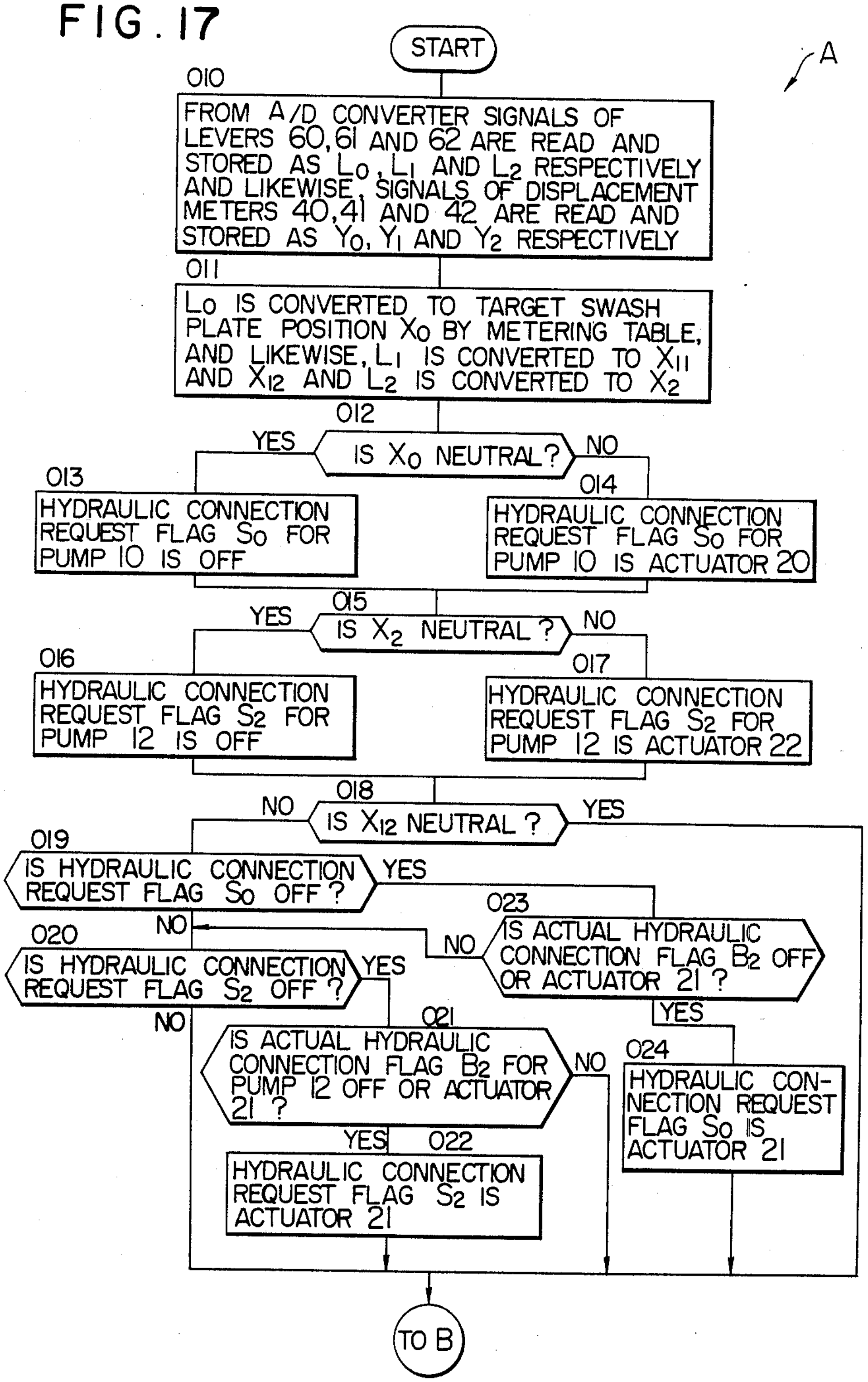
FIGS. 17, 18, 19, 20 and 21 are views respectively showing the partial flow charts A, B, C, D and E shown as a whole in FIG. 16.
Figure 18:
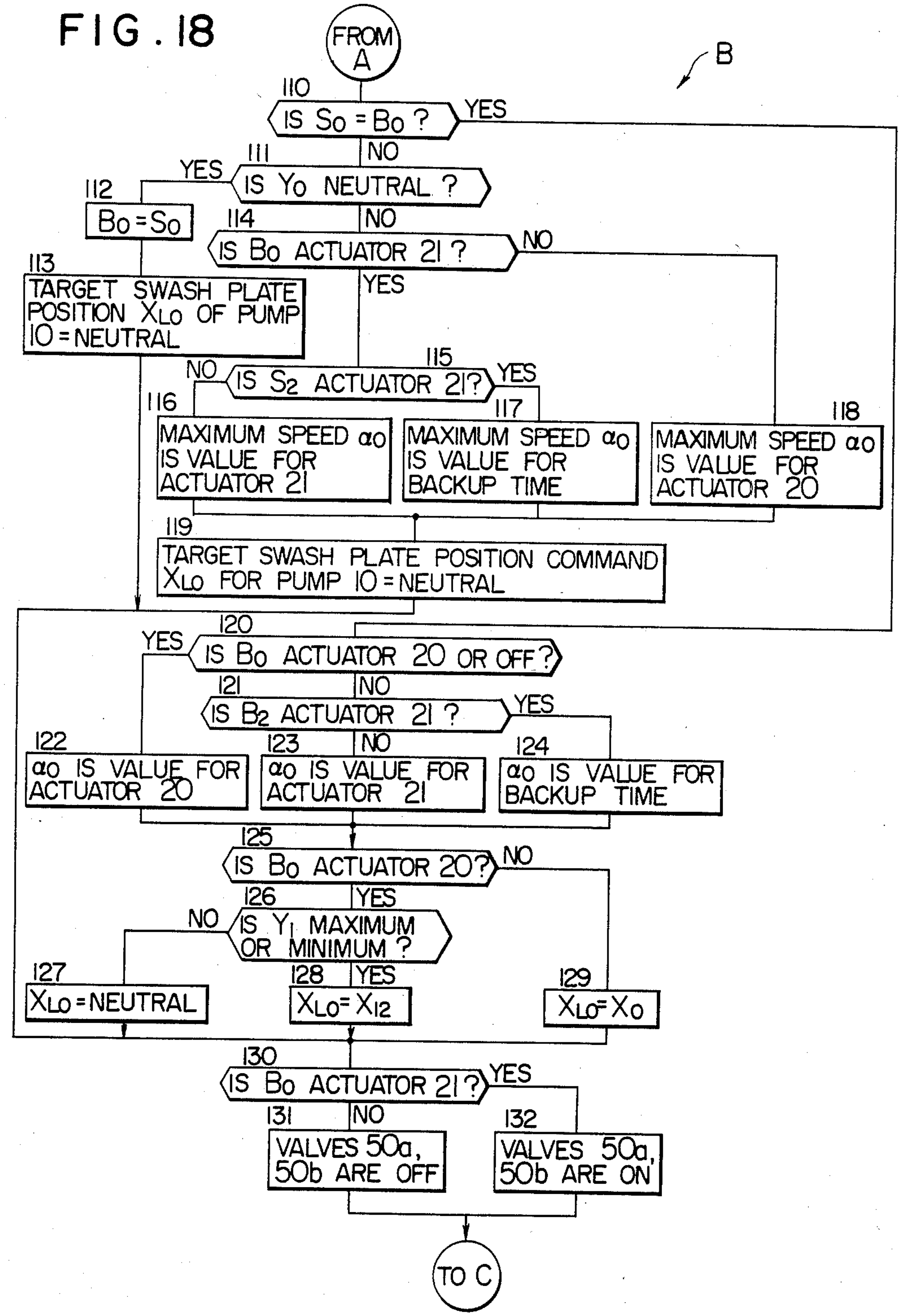
Figure 19:
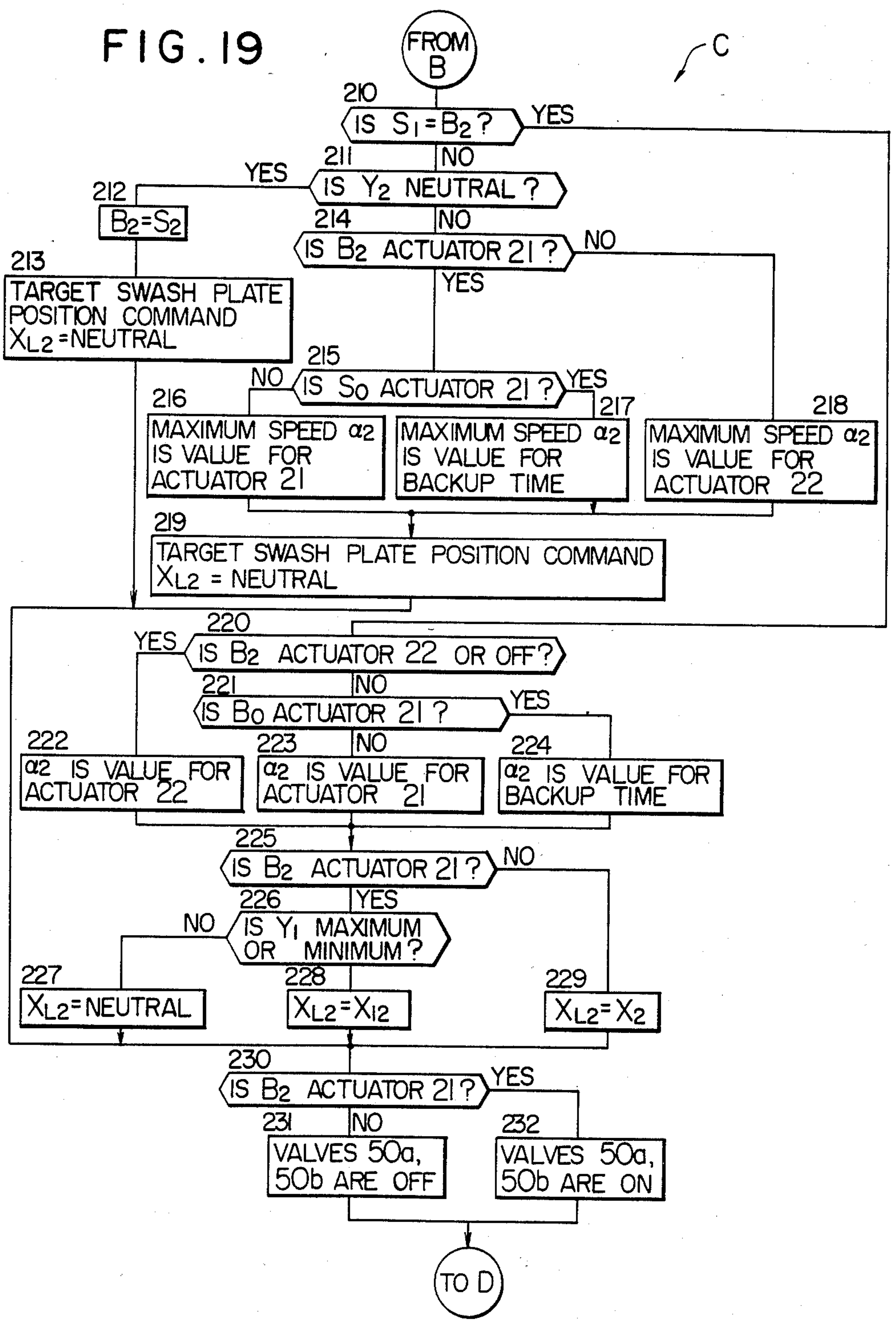
Figure 20:
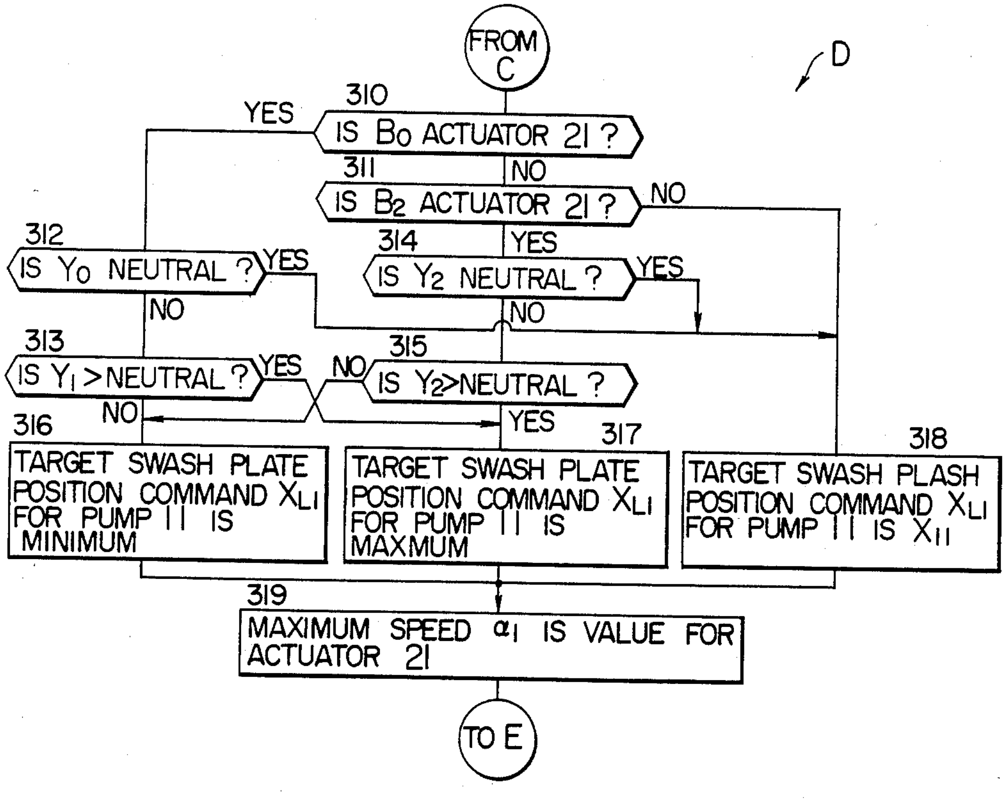

In the ROM memory 703, the operation procedure shown in the flow chart in FIG.S 16–21 is stored. FIG. 16 shows the flow chart in its entirety consisting of partial flow charts A, B, C, D and E shown in FIGS. 17–21 being connected together.

In the partial flow charts A, B, C, D and E, the same symbols that are used in the embodiment shown in FIGS. 6–14 indicate values of the same contents. $S_o$ and $S_2$ are flags indicating the actuators with which the pumps 10 and 12 are required to be connected in hydraulic connection, and $B_o$ and $B_2$ are flags indicating the actuators with which the pumps 10 and 12 are actually connected in hydraulic connection.

Figure 21:
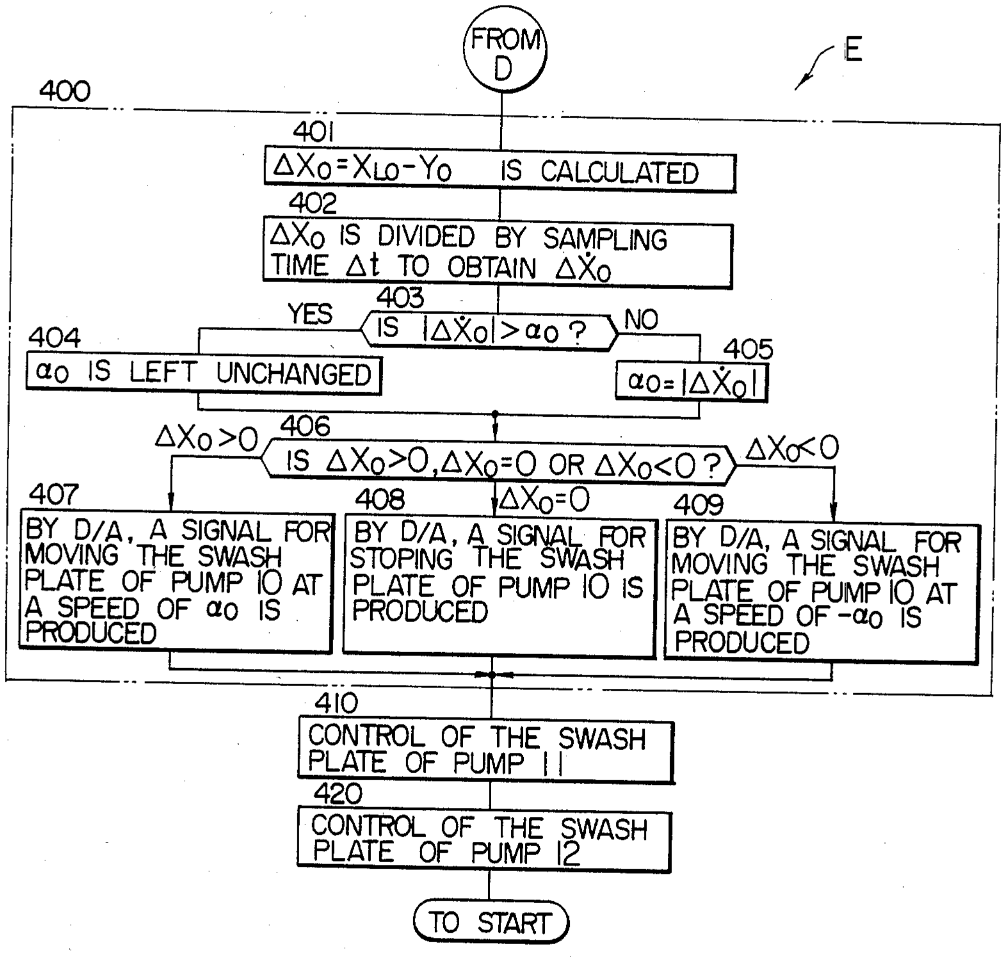

In FIG. 21, step 410 shows swash plate control for the pump 11. Step 410 is substantially similar to step 400 showing swash plate control for the pump 10 except that $\Delta X_o$, $X_{Lo}$, $Y_o$, $\Delta X_o$ and $\alpha_o$ of step 400 are replaced by $\Delta X_1$, $X_L$, $Y_1$, $\Delta X_1$ and $\alpha_1$ in step 410, respectively. Step 420 shows swash plate control for the pump 12 and is substantially similar to step 400 except that $\Delta X_o$, $X_{Lo}$, $Y_o$, $\Delta X_o$ and $\alpha_o$ in step 400 are replaced by $\Delta X_2$, $X_{L2}$, $Y_2$, $\Delta X_2$ and $\alpha_2$ in step 420.

Operation of the control system 700 storing the operation procedure stored in the ROM memory 703 as shown in FIGS. 17–21 can be described by referring to a sequence of steps shown in the time chart in FIG. 5 as follows:

Inoperative 010-011-012-013-015-016-018-110-($B_o$ is off)-120-122-
125-129-130-131-210-($B_o$ is off)-220-222-225-229-230-
231-310-311-318-319-401-402-403-405-406-408-410-420

Time $t_o$-Time $t_1$ 010-011-012-013-015-016-018-110-120-122-125-129-1-
30-131-210-220-222-225-229-230-231-310-311-318-401-4-
02-403-404-406-407-410-420

Time $t_1$-Time $t_2$ (1)
010-011-012-013-015-016-018-019-023-024-110-111-112--
113-130-132-210-220-222-225-229-230-231-310-312-318--
401-402-403-404-406-407-410-420 (2)
010-011-012-013-015-016-018-019-023-024-110-120-121--
123-125--126-127-130-132-210-220-222-225-229-230-231-
-310-312-318-401-402-403-404 or 405-406-407-410-420

Time $t_2$-Time $t_3$ 010-011-012-013-015-016-018-019-023-024-110-120-1-
21-123-125-126-128-130-132-210-220-222-225-229-230-2-
31-310-312-313-317-319-400-410-420

Time $t_4$-Time $t_5$ (1)
010-011-012-014-015-016-018-019-020-021-022-110-111--
114-115-117-119-130-132-210-211-212-213-230-232-310--
312-313-317-319-400-410-420
(2)
010-011-012-014-015-016-018-019-020-021-022-110-111--
114-115-117-119-130-132-210-220-221-224-225-226-228--
230-232-310-312-313-317-319-400-410-420

Time $t_5$ and after 010-011-012-014-015-016-019-020-021-022-110-111-1-
12-113-130-131-210-220-221-224-225-228-230-232-310-3-
11-314-315-317-400-410-420

It will be understood that in the control system 700, constituted by a microcomputer, the same operation as performed by the embodiment constituted by an electronic circuit can be performed.

In the embodiment described hereinabove, the cylinder 21 is brought to selective hydraulic connection with the two hydraulic pumps 10 and 12. However, the invention can have application in the system in which over three hyraulic pumps can be selectively brought to hydraulic connection with the cylinder 21. Also, the aforesaid embodiment has been described by referring to a control system for a hydraulic circuit apparatus for a hydraulic excavator. However, it will be understood that the invention can also have application in a control system for hydraulic circuit apparatus for other hydraulic machines.

From the foregoing description, it will be appreciated that in a control system for a hydraulic connection with one hydraulic pump is brought to hydraulic connection with another hydraulic pump, no change is caused to the speed of the actuator, thereby increasing operability. It will be also appreciated that the invention enables the idle time elapsing when a hydraulic pump in hydraulic connection with one actuator is brought to hydraulic connection with another actuator to be minimized.

We claim:

1. A control system for a hydraulic circuit apparatus including at lest first and second hydraulic pumps of a variable displacement type, a first hydraulic actuator arranged for hydraulic connection with said first pump through a first valve means to be driven thereby, a second hydraulic actuator arranged for respective selective hydraulic connection with said first and second pumps through second and third valve means, an order of priority for the hydraulic connection being set beforehand in such a manner that when an operation signal for the second hydraulic actuator is received while the first pump is inoperative, the first pump takes priority over the second pump for hydraulic connection with the second actuator and, when an operation signal for the first actuator is received while the first pump is in hydraulic connection with the second actuator, the first actuator takes priority over the second actuator for hydraulic connection with the first pump and the second actuator is brough into hydraulic connection with the second pump, the displacement volume of the first pump and switching of the second valve means are controlled in such a manner that, when the first pump which is in hydraulic connection with the second actuator is to be brought into hydraulic connection with the first actuator, the displacement volume of the first pump is once returned to zero before changing the hydraulic connection, the control system comprising:

first means for judging whether the first pump is in hydraulic connection with the second actuator when an operation signal for the first actuator is received, and for generating a command for backing up a reduction in a supply of hydraulic fluid in the second actuator simultaneously when the displacement volume of the first pump begins to return to zero, when it is judged that the first pump is in hydraulic connection with the second actuator;

second means for generating a command for switching the third valve means to an open position in accordance with the backup command from the first means;

third means for generating a command for initiating a displacement of the second pump in accordance with the backup command from the first means, said third means includes means for deciding target displacement volumes for the first and second pumps based on the operation signal for the second actuator, means for selecting the decided target displacement volume as a target displacement volume for the first pump in the absence of the backup command from the first means, and means for selecting zero as a target displacement volume for the first pump and the decided target displacement volume as a target displacement volume for the second pump in the presence of the backup command from the first means; and fourth means for generating a command in accordance with the backup command from the first means for rendering an absolute value of a rate of change in a displacement volume of the first pump upon returning to zero and absolute value of a rate of change of the displacement volume of the second pump after a starting of its displacement substantially equal to each other and larger than a predetermined maximum value of rates of change in the displacement volume of the first and second pumps during normal operation thereof.

2. A control system for a hydraulic circuit apparatus including at least first and second hydraulic pumps of a variable displacement type, a first hydraulic actuator arranged for hydraulic connection with said first pump through a first valve means to be driven thereby, a second hydraulic actuator arranged for respective selective hydraulic connection with said first and second pumps through second and third valve means, an order of priority for the hydrualic connection being set beforehand in such a manner that when an operation signal for the second hydraulic actuator is received while the first pump is inoperative, the first pump takes priority over the second pump for hydraulic connection with the second actuator and, when an operation signal for the first actuator is received whle the first pump is in hydraulic connection with the second actuator, the first actuator takes priority over the second actuator for hydraulic connection with the first pump and the second actuator is brought into hydraulic connection with the second pump, the displacement vcolume of the first pump and switching of the second valve means are controlled in such a manner that, when the first pump which is in hydraulic connection with the second actuator is to be brought into hydraulic connection with the first actuator, the displacement volume of the first pump is returned to zero before changing the hydraulic connection, the control system comprising:

first means for judging whether the first pump is in hyraulic connection with the second actuator when an operation signal for the first actuator is received, and for generating a command for backing up a reduction in a supply of hydraulic fluid in the second actuator simultaneously when the displacement volume of the first pump begins to return to zero, when it is judged that the first pump is in hydraulic connection with the second actuator;

second means for generating a command for switching the third valve means to an open position in accordance with the backup command from the first means;

third means for generating a command for initiating a displacement of the second pump in accordance with the backup command from the first means; and fourth means for generating a command in accordance with the backup command from the first means for rendering an abosolute valve of a rate of change in a displacement volume of the first pump upon returning to zero and the absolute value of a rate of change of the displacement volume of the second pump after a starting of its displacement substantially equal to each other and larger than a predetermined maximum value of rates of change in the displacement volume of said first and second pumps during normal operation thereof, said fourth means includes first and second means for generating preset maximum rates of change in the displacement volume of said first and second pumps during normal operation thereof, respectively, third means for generating preset rates of change in the displacement volume of the first and second pumps during a back-up operation thereof larger than the preset maximum rates of change during normal operation, means for selecting the preset rates of change generated by the third means as maximum rates of change in the displacement volume for the first and second pumps in the presence of the backup command from the first means, and means for inverting one of the selected preset rates to take a negative value.

* * * * *

UNITED STATES PATENT AND TRADEMARK OFFICE

CERTIFICATE OF CORRECTION

PATENT NO. : 4,561,249

DATED : December 31, 1985

INVENTOR(S) : Watanabe, et al

It is certified that error appears in the above-identified patent and that said Letters Patent is hereby corrected as shown below:

On the title page assignee should read

-- (73) Assignee: Hitachi Construction Machinery Co., Ltd. --.

Signed and Sealed this

*Fifth* Day of *August 1986*

[SEAL]

*Attest:*

DONALD J. QUIGG

*Attesting Officer*

*Commissioner of Patents and Trademarks*